(12) United States Patent
Kim et al.

(10) Patent No.: US 12,236,840 B2
(45) Date of Patent: Feb. 25, 2025

(54) DISPLAY APPARATUS, ELECTRONIC APPARATUS AND METHODS THEREOF

(71) Applicant: SAMSUNG ELECTRONICS CO., LTD., Suwon-si (KR)

(72) Inventors: Minji Kim, Suwon-si (KR); Jinho Kim, Suwon-si (KR); Jaejun Sim, Suwon-si (KR); Geunyoung Yu, Suwon-si (KR); Minju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/454,904

(22) Filed: Nov. 15, 2021

(65) Prior Publication Data

US 2022/0122515 A1   Apr. 21, 2022

Related U.S. Application Data

(63) Continuation of application No. PCT/KR2021/014608, filed on Oct. 19, 2021.

(30) Foreign Application Priority Data

Oct. 20, 2020 (KR) ........................ 10-2020-0136082

(51) Int. Cl.
*G09G 3/20* (2006.01)
(52) U.S. Cl.
CPC ....... *G09G 3/2096* (2013.01); *G09G 2354/00* (2013.01); *G09G 2370/04* (2013.01); *G09G 2370/16* (2013.01)
(58) Field of Classification Search
CPC ............ G09G 3/2096; G09G 2354/00; G09G 2370/04; G09G 2370/16; H04W 4/80;
(Continued)

(56) References Cited

U.S. PATENT DOCUMENTS 7,180,936 B1 * 2/2007 Long ................... H04L 5/1438
379/142.05
9,509,515 B2  11/2016 Lee et al.
(Continued)

FOREIGN PATENT DOCUMENTS

JP  2006-526208  11/2006
JP  4729664      2/2008
(Continued)

OTHER PUBLICATIONS

Search Report and Written Opinion issued Jan. 25, 2022 in counterpart International Patent Application No. PCT/KR2021/014608.
Korean Office Action dated Dec. 11, 2024 for KR Application No. 10-2020-0136082.

*Primary Examiner* — Matthew A Eason
*Assistant Examiner* — Sujit Shah
(74) *Attorney, Agent, or Firm* — Nixon & Vanderhye P.C.

(57) ABSTRACT

A display apparatus, an electronic apparatus, and an operating method thereof are provided. The display apparatus includes: a communication interface; a memory storing one or more instructions; and a processor configured to execute the one or more instructions stored in the memory, wherein the processor is further configured to, receive, from an electronic apparatus connected through a first communication protocol, electronic apparatus identification information for identifying the electronic apparatus and unique identification information generated by the electronic apparatus, based on receiving an input for accepting authentication in accordance with the electronic apparatus identification information, store the unique identification information received from the electronic apparatus, based on receiving an authentication request from the electronic apparatus connected through a second communication protocol, control the communication interface to transmit the stored unique identification information to the electronic apparatus, and receive a (Continued)

result of authentication performed based on the transmitted unique identification information, from the electronic apparatus.

17 Claims, 14 Drawing Sheets

(58) Field of Classification Search
CPC ..... H04W 12/50; H04W 76/15; H04W 12/06; H04W 48/16; H04W 48/18; H04W 76/19; H04W 80/00; H04W 12/069; H04W 12/08; H04W 84/12; H04W 12/04; H04W 12/041; H04W 84/18; H04W 76/10; H04W 12/062; H04W 88/02; H04W 88/08; H04L 69/08; H04L 67/14; H04L 63/08; H04L 2209/80; H04L 2463/082; G06F 3/1292; G06F 21/31; G06F 3/1236; G06F 21/6245; G06F 21/445; G06F 2221/2115

See application file for complete search history.

(56) References Cited

U.S. PATENT DOCUMENTS

| | | | |
|---|---|---|---|
| 2006/0186199 | A1 | 8/2006 | Parker |
| 2008/0057890 | A1* | 3/2008 | McKillop ............... H04L 63/10 455/185.1 |
| 2008/0293377 | A1 | 11/2008 | Pauliac |
| 2015/0181634 | A1* | 6/2015 | Cheng ................... H04W 4/026 455/426.1 |
| 2016/0269381 | A1* | 9/2016 | Paul ..................... H04L 63/0876 |
| 2018/0063310 | A1* | 3/2018 | McGary ............ H04M 1/72412 |
| 2018/0091898 | A1* | 3/2018 | Yoon ................ H04N 21/42204 |
| 2018/0121150 | A1* | 5/2018 | Lin ........................ H04M 3/563 |
| 2019/0260854 | A1 | 8/2019 | Sun |
| 2019/0394638 | A1* | 12/2019 | Iida ........................ H04W 76/15 |
| 2020/0288035 | A1 | 9/2020 | Kawana |
| 2021/0183336 | A1* | 6/2021 | Hassan .................... G09G 5/14 |

FOREIGN PATENT DOCUMENTS

| | | |
|---|---|---|
| JP | 2018-173778 | 11/2018 |
| JP | 2020-144406 | 9/2020 |
| KR | 10-2136543 | 8/2020 |

* cited by examiner

DISPLAY APPARATUS, ELECTRONIC APPARATUS AND METHODS THEREOF

CROSS-REFERENCE TO RELATED APPLICATIONS

This application is a continuation of International Application No. PCT/KR2021/014608 designating the United States, filed on Oct. 19, 2021, in the Korean Intellectual Property Receiving Office and claiming priority to Korean Patent Application No. 10-2020-0136082, filed on Oct. 20, 2020, in the Korean Intellectual Property Office, the disclosures of which are incorporated by reference herein in their entireties.

BACKGROUND

Field

The disclosure relates to a display apparatus, an electronic apparatus, and operating methods thereof, and more particularly, to a display apparatus and an electronic apparatus for performing authentication, for improving usability, and operating methods thereof.

Description of Related Art

Connectivity between various devices in homes is becoming increasingly important. In a user's home, there are various home appliances such as audio devices including a TV or a soundbar, a refrigerator, a washing machine, a laundry dryer, lighting, a printer, an air conditioner, door locks, etc. In line with the development of digital technology, Internet technology, and communication technology, development and research into increasing the usability of home appliances using and connecting them in a home is in progress. Home appliances used in a home include devices which have no display and into which it is impossible to input a number string or character string and those which have a display and into which complicated information such as a number string or character string is not input but simple information in the form of yes/no may be input.

A mutual authentication process is required to connect and use home electronic apparatuses, and for authentication of a device that does not have a display and into which a number string or character string is not inputtable, various methods have been proposed. For example, in Bluetooth communication technology, to prevent access by unauthorized devices during data exchange between two devices using different wireless communication channels, both devices perform authentication of the other device using Just Work, PassKey Entry, Out of Band (OOB), etc. Just Work is designed for cases where one or more devices do not have a display for displaying 6 digits or an input module for entering 6 digits. PassKey Entry is a method in which a random 6 digit number is generated and output via a display, and another device receives the output number to perform pairing. Out of Band (OOB) is a method of using an interface other than Bluetooth to exchange pairing information.

For example, assuming a service that provides a soundbar OOBE (Out Of Box Experience) setup through a TV, when the soundbar finds the TV and requests a wireless connection thereto and then a communication channel is established, the TV performs device authentication of the soundbar and sends information of an AP to which the TV is connected, and the soundbar performs authentication of the TV and then grants permission for device control on the soundbar. Here, a user has to confirm twice in total, once on the TV and once on the soundbar.

In the existing authentication method in a wirelessly connected state, when device authentication is not performed to improve usability or both sides' data are exchanged with only one device's authentication, there is a risk that personal information of the user or device may be leaked or the ownership of the user's device may be stolen because access by unauthorized external devices cannot be prevented. In order to prevent such a risk, user intervention is required on both devices to authenticate the other device, which degrades the usability.

SUMMARY

Embodiments of the disclosure provide a display apparatus, an electronic apparatus, and operating methods thereof, in which authentication may be performed on both devices performing authentication while allowing minimized and/or reduced user intervention.

A display apparatus according to an example embodiment of the disclosure includes: a communication interface; a memory storing one or more instructions; and a processor configured to execute the one or more instructions stored in the memory, wherein the processor, by executing the one or more instructions, is further configured to: receive, from an electronic apparatus connected through a first communication protocol, electronic apparatus identification information for identifying the electronic apparatus and unique identification information generated by the electronic apparatus, in response to receiving an input for accepting authentication in accordance with the electronic apparatus identification information, store the unique identification information received from the electronic apparatus, in response to receiving an authentication request from the electronic apparatus connected through a second communication protocol, control the communication interface to transmit the stored unique identification information to the electronic apparatus, and receive, from the electronic apparatus, a result of authentication performed based on the transmitted unique identification information.

According to an example embodiment of the disclosure, the processor may, by executing the one or more instructions, be further configured to output a graphical user interface for inquiring whether the electronic apparatus identification information is authenticated, store the unique identification information in response to an input for accepting authentication of the electronic apparatus, and discard the unique identification information in response to an input indicating that authentication of the electronic apparatus is not accepted.

According to an example embodiment of the disclosure, the processor may, by executing the one or more instructions, be further configured to receive a control signal indicating an authentication success from the electronic apparatus based on the unique identification information transmitted by the display apparatus corresponding to the unique identification information stored in the electronic apparatus.

According to an example embodiment of the disclosure, the processor may, by executing the one or more instructions, be further configured to receive a control signal indicating an authentication failure from the electronic apparatus based on the unique identification information transmitted by the display apparatus not corresponding to the unique identification information stored in the electronic apparatus, and in response to receiving a control signal indicating the authentication failure, output a graphical user interface for requesting manual authentication.

According to an example embodiment of the disclosure, the graphical user interface for requesting manual authentication may include a message guiding to operate a specified function of the electronic apparatus to accept authentication of the display apparatus.

According to an example embodiment of the disclosure, the processor may, by executing the one or more instructions, be further configured to in response to receiving a result indicating an authentication success from the electronic apparatus, control the communication interface to transmit, to the electronic apparatus, at least one of wireless communication connection information of the display apparatus or cloud access information used in accessing a cloud account of a display apparatus registered in a server computer.

According to an example embodiment of the disclosure, an electronic apparatus includes: a communication interface; a memory storing one or more instructions; and a processor configured to execute the one or more instructions stored in the memory, wherein the processor, by executing the one or more instructions, is further configured to: control the communication interface to transmit, to a display apparatus connected through a first communication protocol, electronic apparatus identification information for identifying the electronic apparatus and unique identification information generated by the electronic apparatus, receive, from the display apparatus, a control signal indicating an authentication success of the electronic apparatus based on the display apparatus receiving an input for accepting authentication in accordance with the electronic apparatus identification information, receive the unique identification information from the display apparatus based on an authentication request being transmitted to the display apparatus connected through a second communication protocol, and perform authentication of the display apparatus based on the unique identification information received from the display apparatus.

According to an example embodiment of the disclosure, the processor may, by executing the one or more instructions, be further configured to in response to receiving a control signal indicating an authentication success of the electronic apparatus, store the unique identification information, and upon receiving a control signal indicating an authentication failure of the electronic apparatus in response to an input indicating that authentication of the electronic apparatus is not accepted, discard the unique identification information.

According to an example embodiment of the disclosure, the processor may, by executing the one or more instructions, be further configured to control the communication interface to transmit a control signal indicating an authentication success to the display apparatus based on the unique identification information transmitted by the display apparatus corresponding to the unique identification information stored in the electronic apparatus.

According to an example embodiment of the disclosure, the processor may, by executing the one or more instructions, be further configured to control the communication interface to transmit a control signal indicating an authentication failure to the display apparatus based on the unique identification information transmitted by the display apparatus not corresponding to the unique identification information stored in the electronic apparatus.

According to an example embodiment of the disclosure, the processor may, by executing the one or more instructions, be further configured to control the communication interface to transmit a control signal indicating an authentication success of the display apparatus in response to receiving an input for operating a specified function of the electronic apparatus according to user's manual authentication performed on the display apparatus based on the control signal indicating the authentication failure is transmitted.

According to an example embodiment of the disclosure, the processor may, by executing the one or more instructions, be further configured to receive, from the display apparatus according to the authentication success of the display apparatus, at least one of the wireless communication connection information of the display apparatus or cloud access information used in accessing a cloud account of the display apparatus registered in a server computer.

According to an example embodiment of the disclosure, a method of operating a display apparatus, includes: receiving, from an electronic apparatus connected through a first communication protocol, electronic apparatus identification information for identifying the electronic apparatus and unique identification information generated by the electronic apparatus; in response to receiving an input for accepting authentication in accordance with the electronic apparatus identification information, storing the unique identification information received from the electronic apparatus; in response to receiving an authentication request from the electronic apparatus connected through a second communication protocol, transmitting the stored unique identification information to the electronic apparatus; and receiving a result of authentication performed based on the transmitted unique identification information, from the electronic apparatus.

According to an example embodiment of the disclosure, a method of operating an electronic apparatus, includes: transmitting, to a display apparatus connected through a first communication protocol, electronic apparatus identification information for identifying the electronic apparatus and unique identification information generated by the electronic apparatus, receiving, from the display apparatus, a control signal indicating an authentication success of the electronic apparatus as the display apparatus receives an input for accepting authentication in accordance with the electronic apparatus identification information, receiving the unique identification information from the display apparatus based on an authentication request being transmitted to the display apparatus connected through a second communication protocol, and performing authentication of the display apparatus based on the unique identification information received from the display apparatus.

According to an example embodiment of the disclosure, a non-transitory computer-readable recording medium having recorded thereon one or more programs which, when executed by a processor of a display apparatus, causes an electronic apparatus to perform operations including: receiving from an electronic apparatus connected through a first communication protocol, electronic apparatus identification information for identifying the electronic apparatus and unique identification information generated by the electronic apparatus; in response to receiving an input for accepting authentication in accordance with the electronic apparatus identification information, storing the unique identification information received from the electronic apparatus; in response to receiving an authentication request from the electronic apparatus connected through a second communication protocol, transmitting the stored unique identification information to the electronic apparatus; and receiving a result of authentication performed based on the transmitted unique identification information, from the electronic apparatus.

According to various example embodiments of the disclosure, by inducing authentication of both devices performing authentication in an authentication procedure between the devices, device usability may be improved while increasing the reliability of authentication and minimizing and/or reducing user intervention.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
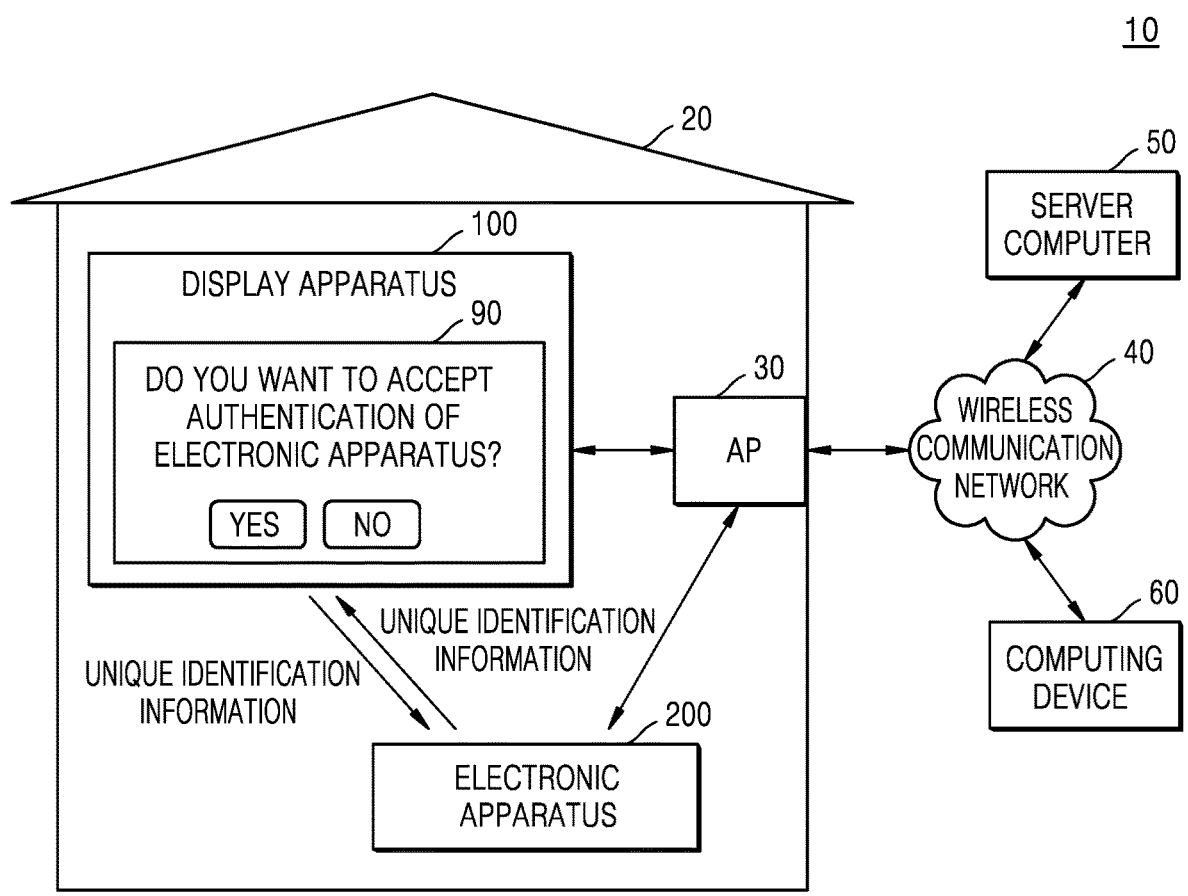
FIG. 1 is a diagram illustrating the concept of performing authentication between a display apparatus and an electronic apparatus, according to various embodiments.

Throughout the disclosure, the expression "at least one of a, b or c" indicates only a, only b, only c, both a and b, both a and c, both b and c, all of a, b, and c, or variations thereof.

Hereinafter, the terms used in the present disclosure will be briefly described, and the disclosure will be described in greater detail.

The terms used in this disclosure are those general terms currently widely used in the art in consideration of functions in regard to the disclosure, but the terms may vary according to the intention of those of ordinary skill in the art, precedents, or new technology in the art. Also, specified terms may be arbitrarily selected, and in this case, the meaning thereof will be described in the detailed description of the disclosure. Thus, the terms used in the disclosure should be understood not as simple names but based on the meaning of the terms and the overall description of the disclosure.

Throughout the disclosure, when a part may "include" a certain element, unless specified otherwise, it may not be construed to exclude another element but may be construed to further include other elements. The terms such as " . . . unit", " . . . module" described in the disclosure or the like refer to units that perform at least one function or operation, and the units may be implemented as hardware or software or as a combination of hardware and software.

Hereinafter, various example embodiments of the disclosure will be described more fully with reference to the accompanying drawings. This disclosure may, however, be embodied in many different forms and should not be construed as limited to the various example embodiments set forth herein. Also, elements not related to description may be omitted in the drawings for clear description of the disclosure, and like reference numerals in the drawings denote like elements throughout the disclosure.

In the various example embodiments of the present disclosure, the term "user" may refer, for example, to a person who controls a function or operation of a computing device or a display apparatus using a control device, and may include a viewer, an administrator, or an installation engineer.

FIG. 1 is a diagram illustrating the concept of performing authentication between a display apparatus and an electronic apparatus, according to various embodiments.

Referring to FIG. 1, a system 10 may include a home environment 20 including a display apparatus 100, an electronic apparatus 200, and an access point (AP) 30, a communication network 40, a cloud server (e.g., a server computer) 50, and a computing device 60. The terms "display apparatus 100, electronic apparatus 200, AP 30, server computer 50, and computing device 60" illustrated in FIG. 1 are terms used to distinguish each entity included in the system 10 from each other, and basically refers to an electronic apparatus or a computing device that includes a processor and a memory and is capable of performing a certain function by processing data, and that includes a communication interface to perform communication with other devices.

The AP 30 may refer, for example, to a wireless access point (WAP), and refers to a device that allows wireless devices to be connected to wired devices using a related standard using Wi-Fi in a computer network. A WAP is usually connected to a router that passes through a wired network and can relay data between a wireless device such as computers and printers and a wired device on a network.

The wireless communication network 40 may include a communication network using Wi-Fi, and Wi-Fi is an abbreviation for wireless fidelity (wireless data transmission system), and is a technique that enables wireless broadband Internet access of devices using short range communication network (Local Area Network) without dedicated lines or telephone lines. Wi-Fi communication is basically communication between an access point that transmits a wireless signal and a terminal via which a user receives a service. Wi-Fi communication uses frequency bands of 2.4 GHz/5 GHz.

The display apparatus 100 may, for example, be a television (TV), but is not limited thereto, and may be implemented using an apparatus including a memory and a processor. For example, the display apparatus 100 may be implemented using various display apparatuses such as a mobile phone, a tablet PC, a digital camera, a camcorder, a laptop computer, a tablet PC, a desktop, an e-book terminal, a digital broadcasting terminal, a personal digital assistant (PDA), a portable multimedia player (PMP), a navigation device, an MP3 player, a wearable device, and the like. The display apparatus 100 may be a stationary type or a mobile type, and may be a digital broadcasting receiver capable of receiving digital broadcasting.

The display apparatus 100 may be controlled by a remote control device, and the remote control device may be implemented using various types of devices for controlling the display apparatus 100, such as a remote control or a mobile phone. When a display of the display apparatus 100 is implemented using a touch screen, the remote control device may be replaced with a user's finger or an input pen. Also, the remote control device may control the display apparatus 100 using short range communication including infrared or Bluetooth. The remote control device may control a function of the display apparatus 100 using at least one of a key, a touchpad, a microphone for receiving a user's voice, or a sensor for recognizing a motion of the remote control device. The user may input a user input corresponding to selection of yes/no to the display apparatus 100 using a button or a remote control device provided on the display apparatus 100 input a character string using a keyboard displayed on a display of the display apparatus 100 or a keyboard provided on the remote control device.

The display apparatus 100 may communicate with the server computer 50 through the communication network 40 using the AP 30, and the display apparatus 100 may store wireless communication connection information or AP information for connecting to the AP 30. The display apparatus 100 may also have cloud account information for using one or more application services provided by the server computer 50. For example, the user may access the server computer 50 through the display apparatus 100 and use one or more application services provided by the server computer 50.

The electronic apparatus 200 may include, for example, an IoT device that controls a home environment, such as an audio output device such as a headphone, a speaker, and a soundbar, a home appliance such as a refrigerator, an air conditioner, a washing machine, a laundry dryer, and a cleaning robot, a lighting device, a thermostat, door locks, or the like. The term "electronic apparatus" is merely a term used to distinguish it from the display apparatus 100 included in the home environment 20, and it will be apparent to those skilled in the art that the electronic apparatus 200 is actually an apparatus that can also be referred to as a display apparatus or a computing device. The electronic apparatus 200 may separately include a function performing unit in addition to a processor or a memory and is focused on performing a certain function, and the electronic apparatus 200 may also include a display so as to enable input of a character string via an input interface or the like. However, in general, the function of the electronic apparatus 200 is more focused on performing its function rather than on input of characters or an aspect as a display, and does not include a display or input interface to input a character string in many cases, or even when the electronic apparatus 200 includes a display and an input interface, it may be inconvenient for a user to input characters using the same. As described above, a device in which it is inconvenient to input characters due to lack of display and input interface resources may be referred to as a headless device.

In order for the display apparatus 100 in the home environment 20 to control the electronic apparatus 200, the display apparatus 100 and the electronic apparatus 200 may need to go through an authentication procedure with each other through a communication connection. In this case, using an authentication method for minimizing and/or reducing user intervention on the side of the electronic apparatus 200, an authentication procedure between the display apparatus 100 and the electronic apparatus 200 may be performed without any problem also when the electronic apparatus 200 does not have a display or an input interface or it is inconvenient to use an input interface.

According to an embodiment of the disclosure, authentication of the display apparatus 100 and authentication of the electronic apparatus 200 may be both enabled through one-time user authentication to minimize and/or reduce user intervention during authentication between the display apparatus 100 and the electronic apparatus 200. For convenience, a procedure of authenticating the electronic apparatus 200 by the display apparatus 100 may be referred to as "first authentication" and a procedure of authenticating the display apparatus 100 by the electronic apparatus 200 may be referred to as "second authentication". In an embodiment, the second authentication may be automatically performed without user intervention by an input that receives the user's acceptance in the first authentication procedure.

According to an embodiment of the disclosure, when the display apparatus 100 receives unique identification information generated by the electronic apparatus 200 from the electronic apparatus 200 connected through a first communication protocol, and receives, from a user, a user input for accepting authentication of the electronic apparatus 200, the display apparatus 100 may store the unique identification information received from the electronic apparatus 200. The unique identification information may include, for example, a PIN (Personal Identification Number). (First authentication) Next, as the display apparatus 100 receives an authentication request from the electronic apparatus 200 connected through a second communication protocol, the display apparatus 100 may transmit the unique identification information stored during the first authentication, to the electronic apparatus 200, and the electronic apparatus 200 may compare the unique identification information received from the display apparatus 100 with the unique identification information generated during the first authentication and held by the electronic apparatus 200 itself, and when the two pieces of unique identification information match, the electronic apparatus 200 may determine to authenticate the display apparatus 100. (Second Authentication)

According to an embodiment of the disclosure, as the first communication protocol used for the first authentication and the second communication protocol used for the second authentication, BT, BLE, Wi-Fi P2P, and the like may be used. The first communication protocol used for the first authentication and the second communication protocol used for the second authentication may be the same or different.

According to an embodiment as described above, when performing an authentication operation between the display apparatus 100 and the electronic apparatus 200, authentication between the two apparatuses, the display apparatus 100 and the electronic apparatus 200, may be easily performed by minimizing and/or reducing user intervention by allowing the second authentication for authenticating the display apparatus 100 by the electronic apparatus 200, to be automatically performed without user intervention, via a single user input indicating the acceptance of a user during the first authentication for authenticating the electronic apparatus 200 by the display apparatus 100. In addition, although there is no user intervention in the second authentication, the electronic apparatus 200 may reliably authenticate the display apparatus 100 by authenticating the same based on the unique identification information generated by the electronic apparatus 200 and the unique identification information received from the display apparatus 100.

According to an embodiment of the disclosure, in the first authentication process, when the display apparatus 100 receives unique identification information of the electronic apparatus 200, in order to receive confirmation from a user as to whether to authenticate the electronic apparatus 200, the display apparatus 100 may output a graphical user interface 90 for inquiring whether to authenticate the electronic apparatus 200. When the graphical user interface 90 is output, the display apparatus 100 may receive identification information such as a name of the electronic apparatus 200 from the electronic apparatus 200 in order to specify the electronic apparatus 200 that is to be authenticated.

According to an embodiment of the disclosure, when the display apparatus 100 receives a user input for accepting authentication of the electronic apparatus 200 in accordance with the graphical user interface 90 output to inquire about whether to authenticate the electronic apparatus 200, the display apparatus 100 may store the unique identification information received from the electronic apparatus 200, and when receiving a user input indicating that the authentication is not accepted, the display apparatus 100 may transmit a control signal commanding to discard the unique identification information, to the electronic apparatus 200. As described above, by receiving confirmation from the user as to whether to authenticate the electronic apparatus 200, using the name of the electronic apparatus 200, acceptance of an authentication request from a malicious apparatus may be prevented and/or reduced. For example, when the display apparatus 100 receives an authentication request from an apparatus in a neighbor's house instead of from the electronic apparatus 200 included in the home environment 20, because the display apparatus 100 outputs a graphical user interface for inquiring whether to authenticate, using the name of the apparatus in the neighbor's house, the user may check the apparatus name displayed on the graphical user interface, and when the name is not an apparatus intended by the user, the user may not accept the authentication to thereby prevent and/or reduce acceptance of an authentication request from a malicious apparatus.

According to an embodiment of the disclosure, when receiving a user input for accepting authentication of the electronic apparatus 200, the display apparatus 100 may transmit, to the electronic apparatus 200, wireless communication connection information (AP information) used to connect the electronic apparatus 200 to an access point for wireless connection. The wireless communication connection information may include an SSID and a password required to access the AP 30. According to an embodiment of the disclosure, the display apparatus 100 may transmit, to the electronic apparatus 200, the wireless communication connection information together with a control signal indicating authentication success during the first authentication procedure. Alternatively, according to an embodiment of the disclosure, the display apparatus 100 may transmit the wireless communication connection information using, for example, an Open Connectivity Foundation (OCF) protocol separate from the first authentication or the second authentication.

According to an embodiment of the disclosure, in the second authentication process, the electronic apparatus 200 may compare the unique identification information received from the display apparatus 100 with the unique identification information generated by the electronic apparatus 200 during the first authentication process and stored in the electronic apparatus 200 itself, and when the two pieces of unique identification information match, the electronic apparatus 200 may determine to have the display apparatus 100 authenticated. In addition, the electronic apparatus 200 may transmit, to the display apparatus 100, a control signal indicating that authentication of the display apparatus 100 has been successful. As described above, in the second authentication process, without requiring an additional user input, the electronic apparatus 200 may authenticate the display apparatus 100 as a valid display apparatus by confirming that the display apparatus 100 that has transmitted the unique identification information is the display apparatus 100 to which the electronic apparatus 200 has provided the unique identification information, by confirming that the unique identification information received from the display apparatus 100 is the same as the unique identification information generated by the electronic apparatus 200 itself. Accordingly, in the second authentication process, the electronic apparatus 200 may authenticate that the display apparatus 100 is a valid counterpart, without user intervention.

According to an embodiment of the disclosure, in the second authentication process, when the electronic apparatus 200 compares the unique identification information received from the display apparatus 100 with the unique identification information generated by the electronic apparatus 200 during the first authentication process and stored in the electronic apparatus 200 itself, the electronic apparatus 200 may use a validity period of the unique identification information, or the like. When generating unique identification information during the first authentication, the electronic apparatus 200 may set a validity period of the unique identification information, and when the set validity period passes, the electronic apparatus 200 may determine to discard the unique identification information held by the electronic apparatus 200. For example, when the validity period of the unique identification information generated by the electronic apparatus 200 is set to 20 seconds, the electronic apparatus 200 may keep the generated unique identification information for 20 seconds, and discard the generated unique identification information when 20 seconds pass. Accordingly, when the electronic apparatus 200 receives unique identification information from the display apparatus 100 within 20 seconds after generating the unique identification information, the electronic apparatus 200 may determine that the unique identification information received from the display apparatus 100 matches the unique identification information stored by the electronic apparatus 200 itself. However, when the electronic apparatus 200 receives unique identification information from the display apparatus 100 20 seconds after generating the unique identification information, as the validity period of the unique identification information generated by the electronic apparatus 200 has passed and thus the unique identification information is discarded, the electronic apparatus 200 may determine that the unique identification information received from the display apparatus 100 and the unique identification information stored by the display apparatus 100 do not match. Even when unique identification information is received within 20 seconds, when the unique identification information is from a malicious apparatus, the unique identification information received from the malicious apparatus does not match the unique identification information stored in the electronic apparatus 200, and thus, authentication will fail.

According to an embodiment of the disclosure, upon receiving a control signal indicating an authentication success from the electronic apparatus 200, the display apparatus 100 may transmit, to the electronic apparatus 200, information used to register the electronic apparatus 200 in a cloud account of the display apparatus 100, that is, cloud access information of the display apparatus 100. The cloud access information may include, for example, cloud server identification information used to access a cloud server and a cloud ID and password as cloud account information of a display apparatus. Upon receiving the cloud access information as described above, the electronic apparatus 200 may access the server computer 50 using the received cloud access information to perform a procedure of registering the electronic apparatus 200 itself in the cloud account of the display apparatus 100. The electronic apparatus 200 is to connect to the AP 30 in order to access the server computer 50, and the AP 30 connection may be performed using wireless communication connection information of the display apparatus 100 obtained through the first authentication process, the second authentication process, or a separate OCF protocol.

According to an embodiment of the disclosure, in the second authentication process, the electronic apparatus 200 may compare the unique identification information received from the display apparatus 100 with the unique identification information generated by the electronic apparatus 200 during the first authentication process and stored in the electronic apparatus 200 itself, and when the two pieces of unique identification information do not match, the electronic apparatus 200 may transmit a control signal indicating that authentication of the display apparatus 100 has failed.

According to an embodiment of the disclosure, upon receiving a control signal indicating an authentication failure from the electronic apparatus 200, the display apparatus 100 may perform a manual authentication procedure by a user. According to the manual authentication procedure, the display apparatus 100 may output a graphical user interface including a message guiding the electronic apparatus 200 to operate a predetermined function in order to accept user authentication in the electronic apparatus 200. For example, the display apparatus 100 may output a graphical user interface including, for example, a message <Please press the volume button of the electronic apparatus to accept the authentication request from the display apparatus on the electronic apparatus>. In addition, when the user presses the volume button of the electronic apparatus 200 according to the above graphical user interface, the electronic apparatus 200 may determine that the authentication of the display apparatus 100 is accepted. As described above, when the electronic apparatus 200 fails to automatically authenticate the display apparatus 100 in the second authentication process, then the display apparatus 100 may be set to proceed to perform a process of performing manual authentication, and accordingly, even when authentication of the display apparatus 100 by the electronic apparatus 200 has failed due to some unintended reasons, the authentication procedure may be completed conveniently.

The server computer 50 may have cloud account information of the display apparatus 100, and may register the electronic apparatus 200 in the cloud account of the display apparatus 100 according to a request from the electronic apparatus 200 that has completed the authentication process with the display apparatus 100. By additionally registering the electronic apparatus 200 in the cloud account of the display apparatus 100 registered in the server computer 50 as described above, the display apparatus 100 may access the server computer 50 and control the electronic apparatus 200 using its own cloud account of the display apparatus 100. For example, when the electronic apparatus 200 is a soundbar, the display apparatus 100 may control the electronic apparatus 200 through a cloud account of the server computer 50 to perform functions such as volume up or volume down, audio playback, and the like. The computing device 60 may also control the electronic apparatus 200 through the cloud account of the server computer 50 as long as the computing device 60 is registered in the cloud account of the display apparatus 100 whether it is in the home environment or outside the home environment. The computing device 60 may be various types of information processing devices or personal portable devices. For example, the computing device 60 may include a smart phone, a tablet PC, a desktop PC, a laptop PC, a wearable computing device, and the like. For example, when the computing device 60 is a smartphone, the user may access the cloud account of the server computer 50 using the smartphone and control the electronic apparatus 200 in the home environment 20, for example, a soundbar, a thermostat, and a door lock, an air conditioner, etc.

Figure 2:
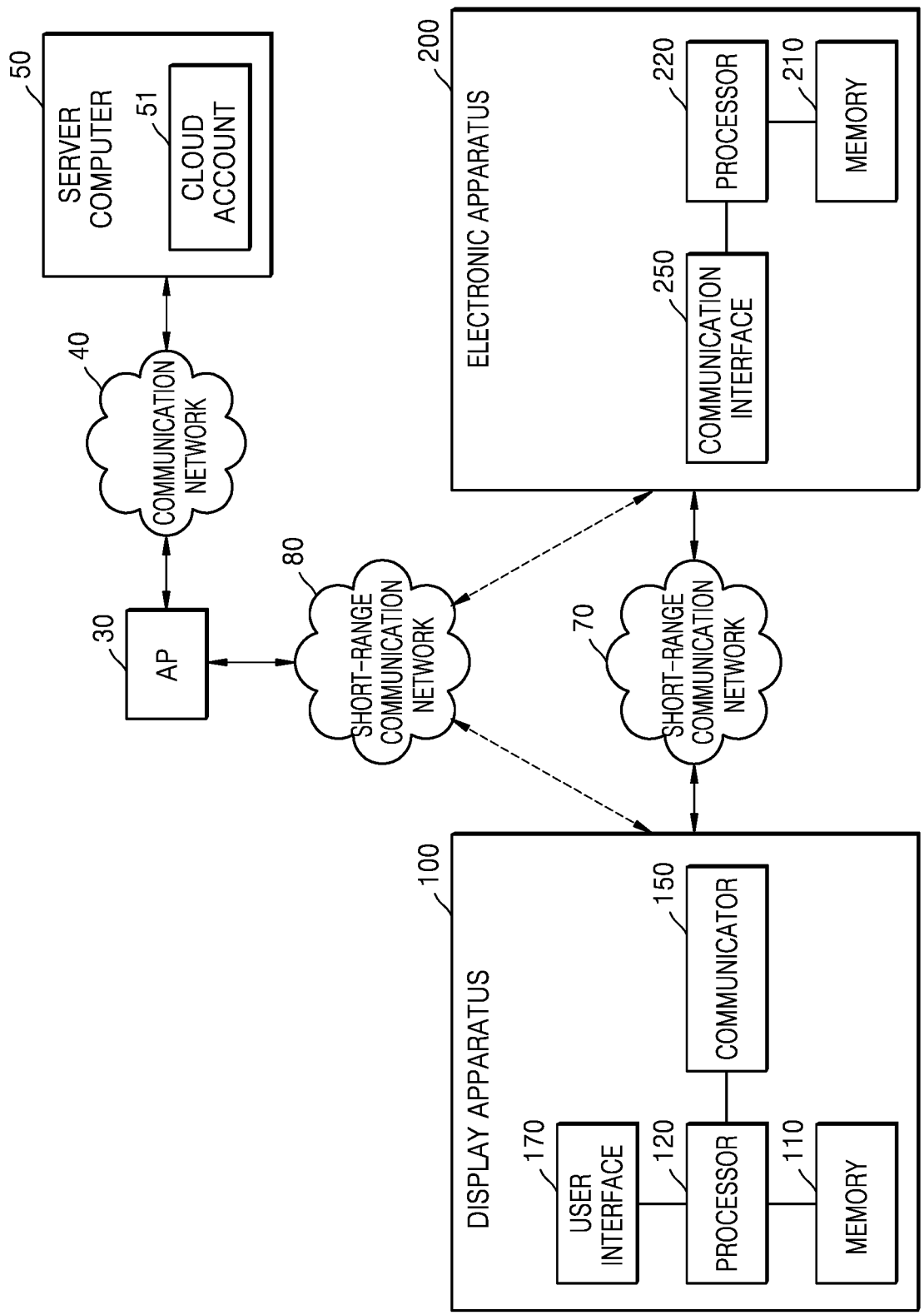
FIG. 2 is a block diagram illustrating an example configuration of a display apparatus and an electronic apparatus, according to various embodiments.

FIG. 2 is a block diagram illustrating an example configuration of a display apparatus and an electronic apparatus, according to various embodiments.

Referring to FIG. 2, a system may include the display apparatus 100, the electronic apparatus 200, and a short-range communication network 70 connecting the display apparatus 100 and the electronic apparatus 200 to each other, the AP 30, a communication network 80 connecting the display apparatus 100 and the electronic apparatus 200 to the AP 30, the server computer 50, and the communication network 40 connecting the AP 30 to the server computer 50.

The short-range communication network 70 may include a communication network that enables communication between the display apparatus 100 and the electronic apparatus 200 in a short range, and may use, for example, Bluetooth, BLE, a soft AP, NFC, Wi-Fi Direct, or the like. A soft AP is an abbreviation of software enabled access point, and refers to software that enables a computer, not a router, to function as a wireless access point.

The communication network 80 may include a Wi-Fi communication network connecting the display apparatus 100 and the electronic apparatus 200 to the AP 30.

The display apparatus 100 and the electronic apparatus 200 may authenticate each other by performing communication through the communication network 70, and the display apparatus 100 may authenticate the electronic apparatus 200 by receiving unique identification information from the electronic apparatus 200 and a confirmation by a user that authentication of the electronic apparatus 200 is accepted. The electronic apparatus 200 may receive the unique identification information transmitted to the display apparatus 100 again from the display apparatus 100, compare the received unique identification information with the unique identification information held by the electronic apparatus 200 itself, and when the two pieces of unique identification information match, the electronic apparatus 200 may authenticate the display apparatus 100.

The display apparatus 100 may include a communicator (e.g., including communication circuitry) 150, a memory 110, a processor (e.g., including processing circuitry) 120, and a user interface (e.g., including user interface circuitry) 170. However, the display apparatus 100 may be implemented by more components than the illustrated components, and is not limited to the above-described example.

According to an embodiment of the disclosure, the communicator 150 may include various communication circuitry and communicate with the electronic apparatus 200 through the communication network 70. The communicator 150 may communicate with the AP 30 through the communication network 80. For example, the communicator 150 may include at least one of a Wi-Fi communication module or a Bluetooth communication module.

According to an embodiment of the disclosure, the communicator 150 may establish a communication channel with the electronic apparatus 200 through the communication network 70, receive, from the electronic apparatus 200, unique identification information generated by the electronic apparatus 200 and identification information of the electronic apparatus 200, and transmit the same to the processor 120. According to an embodiment of the disclosure, the communicator 150 may transmit a control signal indicating an authentication success to the electronic apparatus 200 according to a result indicating that the display apparatus 100 has authenticated the electronic apparatus 200.

According to an embodiment of the disclosure, the communicator 150 may establish a communication channel with the electronic apparatus 200 through the communication network 70, and when receiving an authentication request from the electronic apparatus 200, the communicator 150 may transmit, to the electronic apparatus 200, the unique identification information of the electronic apparatus 200, wherein the unique identification information of the electronic apparatus 200 is received by the display apparatus 100 from the electronic apparatus 200 and stored by the display apparatus 100.

According to an embodiment of the disclosure, the communicator 150 may transmit, to the electronic apparatus 200, wireless communication connection information used for AP access during a first authentication process or a second authentication process, or through a separate and independently set communication channel. The wireless communication setting information includes, for example, an identifier for identifying a basic service set area (BSS) or a BSSID (Basic Service Set Identifier) indicating a network ID, a band and channel number of a communication channel used by a relevant AP, and a password, which is code information required for authentication for accessing the AP. The BSSID may generally refer to a MAC address of an AP.

According to an embodiment of the disclosure, the communicator 150 may transmit, to the electronic apparatus 200, cloud access information during a first authentication process or a second authentication process, or through a separate and independently set communication channel. The cloud access information may include information required for the electronic apparatus 200 to register the electronic apparatus 200 in the cloud account of the display apparatus 100 registered in the server computer 50.

The memory 110 according to an embodiment of the disclosure may store a program for processing and controlling, and may store data input to or output from the display apparatus 100.

The memory 110 may include, for example, at least one type of storage medium from among a flash memory type, a hard disk type, a multimedia card micro type, a card type memory (e.g., SD or XD memory, etc.), random access memory (RAM), static random access memory (SRAM), read-only memory (ROM), electrically erasable programmable read-only memory (EEPROM), programmable read-only memory (PROM), magnetic memory, a magnetic disk, or an optical disk.

The processor 120 may include various processing circuitry and controls the overall operation of the display apparatus 100. For example, the processor 120 may perform the function of the display apparatus 100 described in the disclosure by executing one or more instructions stored in the memory 110.

In an embodiment of the disclosure, the processor 120 may execute one or more instructions stored in the memory 110 to control the above-described operations to be performed. In this case, the memory 110 may store one or more instructions executable by the processor 120.

In addition, in an embodiment of the disclosure, the processor 120 may store one or more instructions in an internally provided memory and execute one or more instructions stored in the internally provided memory to control the above-described operations to be performed. For example, the processor 120 may perform a certain operation by executing at least one instruction or program stored in the memory internally provided in the processor 120 or the memory 110.

In addition, although a single processor 120 is illustrated in FIG. 2, a plurality of processors may be included. In this case, each of the operations performed by a display apparatus according to an embodiment of the disclosure may be performed through at least one of the plurality of processors.

According to an embodiment of the disclosure, by executing one or more instructions stored in the memory 110, the processor 120 receives electronic apparatus identification information for identifying the electronic apparatus and unique identification information generated by the electronic apparatus, from the electronic apparatus connected through a first communication protocol, stores, upon receiving a user input for accepting authentication in accordance with the electronic apparatus identification information, the unique identification information received from the electronic apparatus, transmits, upon receiving an authentication request from the electronic apparatus connected through a second communication protocol, the stored unique identification information, and receives, from the electronic apparatus, a result of authentication performed based on the transmitted unique identification information and the unique identification information held by the electronic apparatus.

According to an embodiment of the disclosure, by executing one or more instructions stored in the memory 110, the processor 120 may output a graphical user interface inquiring about whether to authenticate electronic apparatus identification information, store the unique identification information according to a user input for accepting authentication of the electronic apparatus, and transmit, to the electronic apparatus 200, a control signal for commanding to discard the unique identification information according to a user input indicating that authentication of the electronic apparatus is not accepted.

According to an embodiment of the disclosure, by executing one or more instructions stored in the memory 110, the processor 120 may receive a control signal indicating an authentication success from the electronic apparatus, as the unique identification information transmitted by the display apparatus matches the unique identification information held by the electronic apparatus.

According to an embodiment of the disclosure, by executing one or more instructions stored in the memory 110, the processor 120 may receive a control signal indicating an authentication failure from the electronic apparatus as the unique identification information transmitted by the display apparatus and the unique identification information held by the electronic apparatus do not match, and may output, upon receiving the control signal indicating the authentication failure, a graphical user interface for requesting manual authentication by the user.

According to an embodiment of the disclosure, the graphical user interface for requesting manual authentication by the user may include a message guiding the electronic apparatus to operate a predetermined function of the electronic apparatus to accept authentication of the display apparatus.

According to an embodiment of the disclosure, by executing one or more instructions stored in the memory 110, the processor 120 may transmit to the electronic apparatus, according to the completion of mutual authentication between the display apparatus and the electronic apparatus, at least one of wireless communication connection information of the display apparatus used by the electronic apparatus in connecting the electronic apparatus to an access point for wireless connection or cloud access information used in accessing a cloud account of the display apparatus registered in a server computer.

The user interface 170 may be any form of interface unit and may include various user interface circuitry via which a user input may be received. For example, the user interface 170 may include operation buttons arranged on a portion of the display apparatus 100 to receive a user input, an optical receiver or communicator for receiving an input from a remote control device, a touch input when a display is implemented using a touch sensitive display, a microphone for receiving a user's voice utterance input, and the like.

The display apparatus 100 may be any type of apparatus that includes a processor and a memory and performs a function. The display apparatus 100 may be a stationary or portable device. For example, the display apparatus 100 may include various display apparatuses such as computers including desktops, laptops, tablets, televisions, set-top boxes, smartphones, cellular phones, game players, music players, video players, medical equipment, home appliances, or the like. The display apparatus 100 may also be referred to as a display apparatus, a computing device, a media device, etc.

The electronic apparatus 200 will now be described.

The electronic apparatus 200 may include a communication interface (e.g., including communication circuitry) 250, a memory 210, a processor (e.g., including processing circuitry) 220. However, the electronic apparatus 200 may be implemented by more components than the illustrated components, and is not limited to the above-described example.

According to an embodiment of the disclosure, the communication interface 250 may include various communication circuitry and communicate with the display apparatus 100 through the communication network 70. For example, the communication interface 250 may include at least one of a Wi-Fi communication module or a Bluetooth communication module.

According to an embodiment of the disclosure, the communication interface 250 may establish a communication channel with the display apparatus 100 through the communication network 70, and transmit, to the display apparatus 100, unique identification information generated by the electronic apparatus 200 and identification information of the electronic apparatus 200.

According to an embodiment of the disclosure, the communication interface 250 may receive, from the display apparatus 100, a control signal indicating an authentication success according to an authentication success of the electronic apparatus 200 in the display apparatus 100 or a control signal indicating an authentication failure according to an authentication failure of the electronic apparatus 200 in the display apparatus 100. The control signal indicating an authentication failure may further include a command to discard the unique identification information generated by the electronic apparatus 200.

According to an embodiment of the disclosure, after establishing a communication channel with the display apparatus 100 via the communication network 70 and transmitting an authentication request to the display apparatus 100, the communication interface 250 may receive unique identification information of the electronic apparatus 200 from the display apparatus 100.

According to an embodiment of the disclosure, according to a result of authentication performed based on the unique identification information received by the electronic apparatus 200 from the display apparatus 100 and the unique identification information held by the electronic apparatus 200, the communication interface 250 may transmit, to the display apparatus 100, a control signal indicating an authentication success when the result is an authentication success and a control signal indicating an authentication failure when the result is an authentication failure.

According to an embodiment of the disclosure, the communication interface 250 may connect to the AP 30 through the communication network 70 using wireless communication setting information received from the display apparatus 100.

According to an embodiment of the disclosure, the communication interface 250 may connect to the server computer 50 using cloud access information received from the display apparatus 100.

The memory 210 according to an embodiment of the disclosure may store a program for processing and controlling the processor 220, and may store data input to the electronic apparatus 200 or output from the electronic apparatus 200.

The memory 210 may include, for example, at least one type of storage medium from among a flash memory type, a hard disk type, a multimedia card micro type, a card type memory (e.g., SD or XD memory, etc.), random access memory (RAM), static random access memory (SRAM), read-only memory (ROM), electrically erasable programmable read-only memory (EEPROM), programmable read-only memory (PROM), magnetic memory, a magnetic disk, or an optical disk.

The processor 220 may include various processing circuitry and controls the overall operation of the electronic apparatus 200. For example, the processor 220 may perform a function of the electronic apparatus 200 described in the disclosure by executing one or more instructions stored in the memory 210.

In an embodiment of the disclosure, the processor 220 may execute one or more instructions stored in the memory 210 to control the above-described operations to be performed. In this case, the memory 210 may store one or more instructions executable by the processor 220.

In addition, in an embodiment of the disclosure, the processor 220 may store one or more instructions in an internally provided memory and execute one or more instructions stored in the internally provided memory to control the above-described operations to be performed. That is, the processor 220 may perform a certain operation by executing at least one instruction or program stored in the memory internally provided in the processor 220 or the memory 210.

Figure 3:
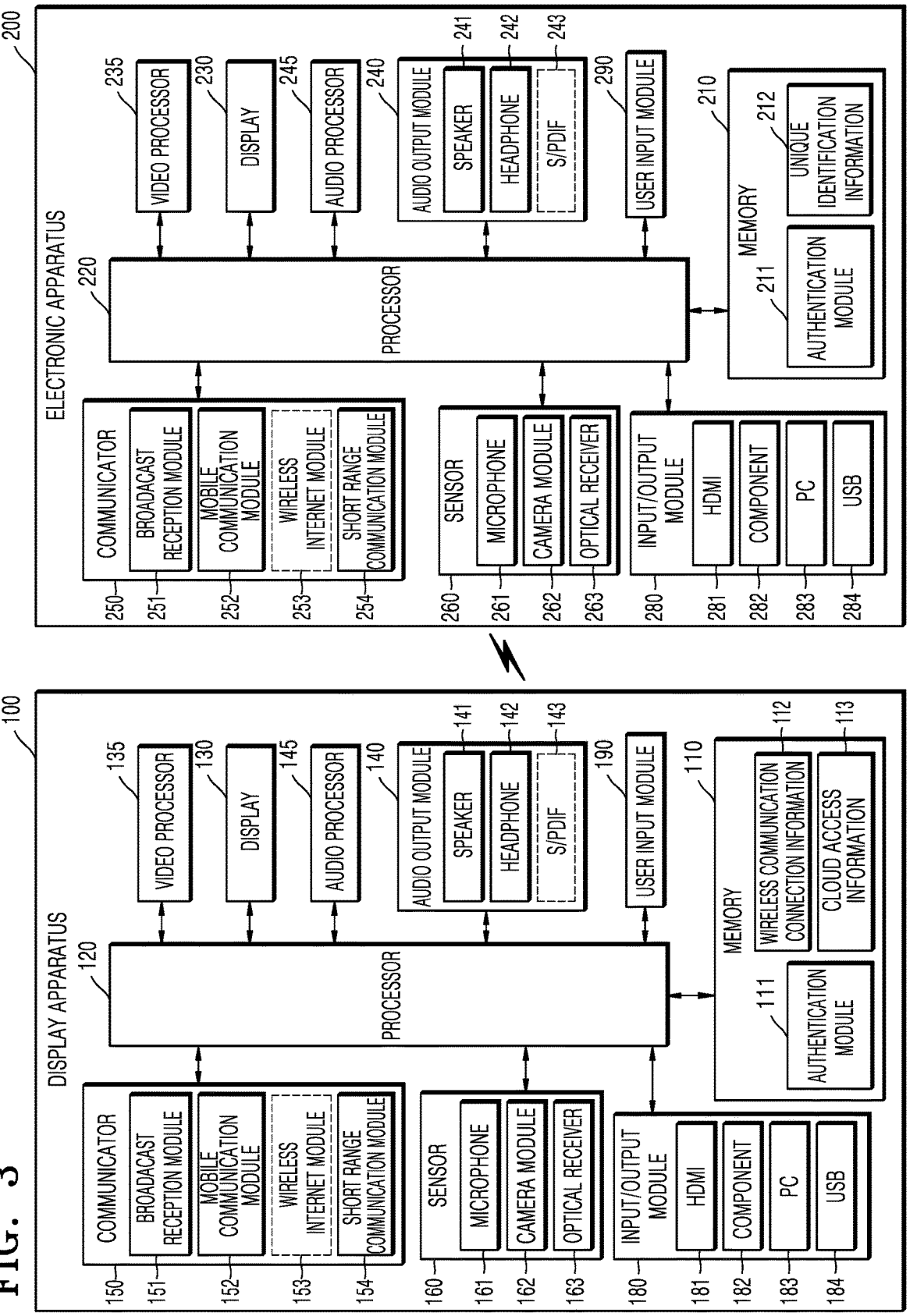
FIG. 3 is a block diagram illustrating an example configuration of a display apparatus and an electronic apparatus, according to various embodiments.

Although a single processor 220 is illustrated in FIGS. 2 and 3, a plurality of processors may be included. In this case, each of the operations performed by an electronic apparatus according to an embodiment of the disclosure may be performed through at least one of the plurality of processors.

According to an embodiment of the disclosure, by executing one or more instructions stored in the memory 210, the processor 220 transmits (e.g., controls the communication interface to transmit) electronic apparatus identification information for identifying an electronic apparatus and unique identification information generated by the electronic apparatus, to a display apparatus connected through a first communication protocol, receives, as the display apparatus receives a user input for accepting authentication in accordance with the electronic apparatus identification information, a control signal indicating a success of the authentication of the electronic apparatus, receives, upon transmitting an authentication request to the display apparatus connected through a second communication protocol, unique identification information received from the display apparatus, and transmits, to the display apparatus, a result of authentication performed based on the unique identification information received from the display apparatus and the unique identification information held by the electronic apparatus.

According to an embodiment of the disclosure, by executing one or more instructions stored in the memory 210, the processor 220 may store unique identification information, upon receiving a control signal indicating a success of the authentication of the electronic apparatus, and may discard the unique identification information, upon receiving a control signal indicating a failure of the authentication of the electronic apparatus according to a user input indicating that authentication of the electronic apparatus is not accepted.

According to an embodiment of the disclosure, by executing one or more instructions stored in the memory 210, the processor 220 may transmit a control signal indicating an authentication success to the display apparatus, as the unique identification information transmitted by the display apparatus matches the unique identification information held by the electronic apparatus.

According to an embodiment of the disclosure, by executing one or more instructions stored in the memory 210, the processor 220 may transmit a control signal indicating an authentication failure to the display apparatus, as the unique identification information transmitted by the display apparatus does not match the unique identification information held by the electronic apparatus.

According to an embodiment of the disclosure, by executing one or more instructions stored in the memory 210, the processor 220 may transmit a control signal indicating an authentication success of the display apparatus in response to receiving a user input for operating a predetermined function of the electronic apparatus according to user's manual authentication performed on the display apparatus as a control signal indicating an authentication failure is transmitted.

According to an embodiment of the disclosure, by executing one or more instructions stored in the memory 210, according to the completion of mutual authentication between the display apparatus and the electronic apparatus, the processor 220 may receive from the display apparatus, at least one of wireless communication connection information used to wirelessly connect the electronic apparatus to an access point or cloud access information used to access a cloud account of the display apparatus registered in a server computer.

The server computer 50 may communicate with the display apparatus 100 or the electronic apparatus 200 by connecting to the AP 30 through the communication network 40. According to an example, the server computer 50 stores the cloud account of the display apparatus 100, and may register the electronic apparatus 200 in the cloud account of the display apparatus 100 according to a request from the electronic apparatus 200 accessing using the cloud access information. Based on the registration in the same cloud account, the display apparatus 100 may control the electronic apparatus 200 through the server computer 50.

For example, when the display apparatus 100 is a television and the electronic apparatus 200 is a soundbar, after the mutual authentication operation as described above, the soundbar may receive wireless communication connection information and cloud access information from the television, and access the server computer 50 using the information and request to register the soundbar in cloud account information of the television. Based on the above-described registration, the user may access the server computer 50 using the television and control a function of the soundbar.

For example, when the display apparatus 100 is a smart phone and the electronic apparatus 200 is an air conditioner, after the mutual authentication operation as described above, the air conditioner may receive wireless communication connection information and cloud access information from the smart phone, and access the server computer 50 using the information and request to register the air conditioner in cloud account information of the smartphone. Based on the above-described registration, the user may access the server computer 50 using the smart phone and control a function of the air conditioner.

FIG. 3 is a block diagram illustrating an example configuration of a display apparatus and an electronic apparatus, according to various embodiments.

In FIG. 3, like elements as those in FIG. 2 are labeled with like reference numerals. Thus, details of the display apparatus 100 described above with reference to FIG. 2 may not be repeated here.

Figure 4:
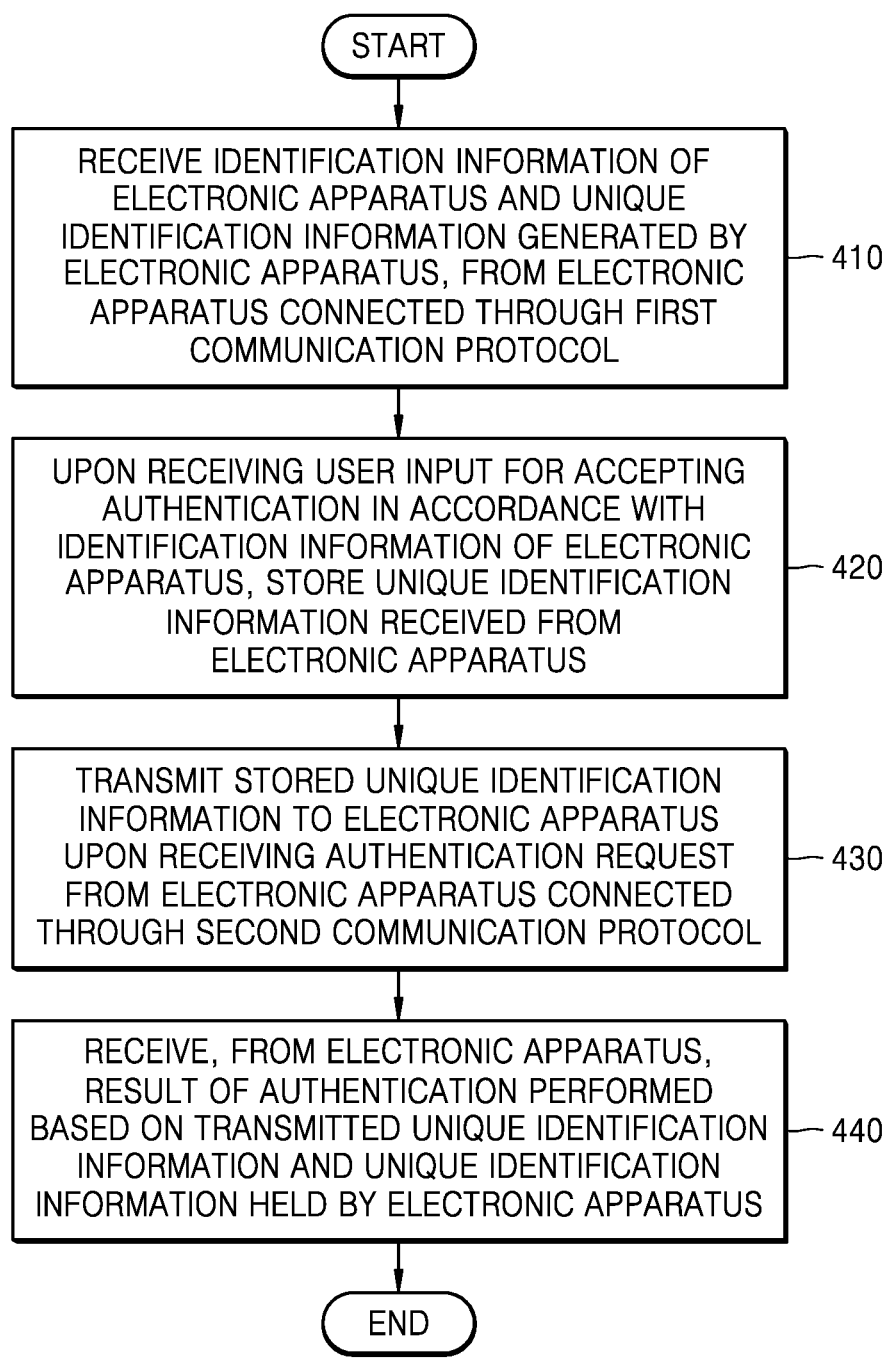
FIG. 4 is a flowchart illustrating an example operation in a display apparatus, according to various embodiments.

Referring to FIG. 4, in addition to the communicator 150, the memory 110, and the processor 120, the display apparatus 100 may further include a display 130, a video processor (e.g., including video processing circuitry) 135, an audio processor (e.g., including audio processing circuitry) 145, an audio output module (e.g., including audio output circuitry) 140, a sensor 160, an input/output module (e.g., including input/output circuitry) 180, and a user input module (e.g., including user input circuitry) 190. The processor 120 may include various processing circuitry and control each component of the display apparatus 100 to allow them to perform operations.

Description of the details of the memory 110 and the processor 120 that are described with reference to FIG. 2 may not be repeated in the description of FIG. 3.

The display 130 may display an image on a screen according to the control by the processor 120. An image displayed on the screen may be received from the communicator 150, the input/output module 180, and the memory 110.

According to an embodiment of the disclosure, the display 130 may output a graphical user interface including a message for inquiring about whether authentication of the electronic apparatus is accepted.

The video processor 135 may include various video processing circuitry and process image data to be displayed via the display 130, and may perform various image processing operations on image data, such as decoding, rendering, scaling, noise removal, frame rate conversion, and resolution conversion.

The audio processor 145 may include various audio processing circuitry and perform processing on audio data. In the audio processor 145, various processes such as decoding or amplification, or noise removal on audio data may be performed.

The audio output module 140 may include various audio output circuitry and output audio included in a broadcast signal received according to the control by the processor 120, an audio input using the communicator 150 or the input/output module 180, an or audio stored in the memory 110. The audio output module 140 may include at least one of a speaker 141, a headphone output terminal 142 or an S/PDIF (Sony/Philips Digital Interface) output terminal 143.

The communicator 150 may include one or more modules including various communication circuitry that enable wireless communication between the display apparatus 100 and a wireless communication system or between the display apparatus 100 and a network in which another display apparatus is located. For example, the communicator 150 may include a broadcast reception module 151, a mobile communication module 152, a wireless Internet module 153, and a short-range communication module 154. The communicator 150 may be referred to as a transceiver.

The broadcast reception module 151 may receive a broadcast signal and/or broadcast-related information from an external broadcast management server via a broadcast channel. A broadcast signal may include not only a TV broadcast signal, a radio broadcast signal, and a data broadcast signal, but also a broadcast signal in a form in which a data broadcast signal is combined with a TV broadcast signal or a radio broadcast signal.

The mobile communication module 152 may transmit and receive a radio signal with at least one of a base station, an external terminal, or a server on a mobile communication network. The radio signal may include a voice call signal, a video call signal, or various types of data according to transmission and reception of text/multimedia messages.

The wireless Internet module 153 may refer, for example, to a module used for wireless Internet access, and may be built in a device or included externally. Examples of wireless Internet technology that may be used include Wireless LAN (WLAN) (WiFi), Wireless broadband (Wibro), World Interoperability for Microwave Access (Wimax), or High Speed Downlink Packet Access (HSDPA). The display apparatus 100 may establish a Wi-Fi peer-to-peer (P2P) connection with another device using the wireless Internet module 153.

According to an embodiment of the disclosure, to perform authentication between the display apparatus 100 and the electronic apparatus 200, the wireless Internet module 153 may perform a P2P connection with the electronic apparatus 200.

The short-range communication module 154 may refer, for example, to a module for short-range communication. As a short-range communication technology, Bluetooth, Radio Frequency Identification (RFID), infrared data association (IrDA), Ultra Wideband (UWB), ZigBee, and the like may be used.

According to an embodiment of the disclosure, to perform authentication between the display apparatus 100 and the electronic apparatus 200, the short-range communication module 154 may perform a Bluetooth connection with the electronic apparatus 200.

The sensor 160 may include various sensors and detect a user's voice, a user's image, or a user's interaction, and may include a microphone 161, a camera module 162, and an optical receiver 163. The microphone 161 may receive an uttered voice of a user. The microphone 161 may convert received voice into an electrical signal and output the same to the processor 120. The camera module 162 may receive an image corresponding to a user's motion including a gesture within a range of camera recognition (e.g., a continuous frame). The optical receiver 163 may receive an optical signal (including a control signal) received from a remote control device. The optical receiver 163 may receive an optical signal corresponding to a user input (e.g., a touch, pressing, a touch gesture, voice, or motion) from a remote control device. A control signal may be extracted from the received optical signal under the control by the processor 120.

A user input for responding to an inquiry about whether to accept authentication of an electronic apparatus, according to an embodiment of the disclosure, may be received via at least one of the microphone 161, the camera module 162, or the optical receiver 163.

The input/output module 180 may include various input/output circuitry and receive a video (e.g., a moving image, etc.), audio (e.g., voice, music, etc.) and additional information (e.g., EPG, etc.) from outside of the display apparatus 100 according to the control by the processor 120. The input/output module 180 may include one of a High-Definition Multimedia Interface (HDMI) port 181, component jack 182, a PC port 183, and a Universal Serial Bus (USB) port 184. The input/output module 180 may include a combination of the HDMI port 181, the component jack 182, the PC port 183, and the USB port 184.

The user input module 190 may refer, for example, to a module including various circuitry used by a user to input data for controlling the display apparatus 100. For example, the user input module 190 may include a key pad, a dome switch, a touch pad, a jog wheel, a jog switch, and the like, but is not limited thereto.

A user input for responding to the inquiry about whether to accept authentication of the electronic apparatus, according to an embodiment of the disclosure, may be received via the user input module 190.

The memory 110 according to an embodiment of the disclosure may store a program for processing and controlling, and may store data input to or output from the display apparatus 100. The memory 110 may store data necessary for operation of the display apparatus 100.

In addition, programs stored in the memory 110 may be classified into a plurality of modules according to their functions.

According to an embodiment of the disclosure, the memory 110 may include an authentication module 111 including one or more instructions for performing an authentication procedure between the display apparatus 100 and the electronic apparatus 200, wireless communication connection information 112 required by the display apparatus 100 to connect to an access point, and cloud account information 113 of the display apparatus 100 registered in a server computer. The wireless communication connection information 112 is information required by the display apparatus 100 to access the AP 30, and may include a BSSID, a password, and the like. The cloud access information 113 is information for accessing the cloud account of the display apparatus 100 registered in the server computer 50 and may include information for accessing a server computer and cloud account information of the display apparatus 100.

The processor 120 may include various processing circuitry and control the overall operation of the display apparatus 100 and a signal flow between internal components of the display apparatus 100 and process data. The processor 120 may execute an OS (operation system) and various applications stored in the memory 110 when there is a user input or preset and stored conditions are satisfied.

In addition, the processor 120 may include an internal memory. In this case, at least one of data, programs, or instructions stored in the memory 110 may be stored in an internal memory (not shown) of the processor 120.

The block diagrams of the display apparatus 100 illustrated in FIGS. 2 and 3 are block diagrams illustrating an example embodiment of the disclosure. Each component of the block diagrams may be integrated, added, or omitted according to the specifications of the display apparatus 100 that is actually implemented. For example, when necessary, two or more components may be combined into a single component, or a single component may be divided into two or more components. In addition, functions performed by each block are for explaining embodiments of the disclosure, and specific operations or devices thereof do not limit the scope of the disclosure.

Thus, details of the electronic apparatus 200 described above with reference to FIG. 2 may not be repeated here.

Referring to FIG. 3, in addition to the communicator 250, the memory 210, and the processor 220, the electronic apparatus 200 may further include a display 230, a video processor (e.g., including video processing circuitry) 235, an audio processor (e.g., including audio processing circuitry) 245, an audio output module (e.g., including audio output circuitry) 240, a sensor 260, an input/output module (e.g., including input/output circuitry) 280, and a user input module (e.g., including user input circuitry) 290. The processor 220 may include various processing circuitry and control each component of the electronic apparatus 200 to allow them to perform operations.

Description of the details of the memory 210 and the processor 220 that are described with reference to FIG. 2 may not be repeated in the description of FIG. 3.

The display 230 may display an image on a screen according to the control by the processor 220. An image displayed on the screen may be received from the communicator 250, the input/output module 280, and the memory 210.

The video processor 235 may include various video processing circuitry and process image data to be displayed via the display 230, and may perform various image processing operations on image data, such as decoding, rendering, scaling, noise removal, frame rate conversion, and resolution conversion.

The audio processor 245 may include various audio processing circuitry and perform processing on audio data. In the audio processor 245, various processes such as decoding or amplification, or noise removal on audio data may be performed.

The audio output module 240 may include various audio output circuitry and output audio included in a broadcast signal received according to the control by the processor 220, an audio input using the communicator 250 or the input/output module 280, or audio stored in the memory 210. The audio output module 240 may include at least one of a speaker 241, a headphone output terminal 242 or an S/PDIF (Sony/Philips Digital Interface) output terminal 243.

The communicator 250 may include one or more modules, each include various communication circuitry, that enable wireless communication between the electronic apparatus 200 and a wireless communication system or between the electronic apparatus 200 and a network in which another electronic apparatus is located. For example, the communicator 250 may include a broadcast reception module 251, a mobile communication module 252, a wireless Internet module 253, and a short-range communication module 254. The communicator 250 may be referred to as a transceiver.

The broadcast reception module 251 may receive a broadcast signal and/or broadcast-related information from an external broadcast management server via a broadcast channel. A broadcast signal may include not only a TV broadcast signal, a radio broadcast signal, and a data broadcast signal, but also a broadcast signal in a form in which a data broadcast signal is combined with a TV broadcast signal or a radio broadcast signal.

The mobile communication module 252 may transmit and receive a radio signal with at least one of a base station, an external terminal, or a server on a mobile communication network. The radio signal may include a voice call signal, a video call signal, or various types of data according to transmission and reception of text/multimedia messages.

The wireless Internet module 253 may refer, for example, to a module used for wireless Internet access, and may be built in a device or included externally. Examples of wireless Internet technology that may be used include Wireless LAN (WLAN) (WiFi), Wireless broadband (Wibro), World Interoperability for Microwave Access (Wimax), or High Speed Downlink Packet Access (HSDPA). The electronic apparatus 200 may establish a Wi-Fi peer-to-peer (P2P) connection with another device using the wireless Internet module 253.

According to an embodiment of the disclosure, to perform authentication between the display apparatus 100 and the electronic apparatus 200, the wireless Internet module 253 may perform a P2P connection with the display apparatus 100.

The short-range communication module 254 may refer, for example, to a module for short-range communication. As a short-range communication technology, Bluetooth, Radio Frequency Identification (RFID), infrared data association (IrDA), Ultra Wideband (UWB), ZigBee, and the like may be used.

According to an embodiment of the disclosure, to perform authentication between the display apparatus 100 and the electronic apparatus 200, the short range communication module 254 may perform a Bluetooth connection with the display apparatus 100.

The sensor 260 may include various sensors and detect a user's voice, a user's image, or a user's interaction, and may include a microphone 261, a camera module 262, and an optical receiver 263. The microphone 261 may receive an uttered voice of a user. The microphone 261 may convert received voice into an electrical signal and output the same to the processor 120. The camera module 262 may receive an image corresponding to a user's motion including a gesture within a range of camera recognition (e.g., a continuous frame). The optical receiver 263 may receive an optical signal (including a control signal) received from a remote control device. The optical receiver 263 may receive an optical signal corresponding to a user input (e.g., a touch, pressing, a touch gesture, voice, or motion) from a remote control device. A control signal may be extracted from the received optical signal under the control by the processor 220.

The input/output module 280 may include various input/output circuitry and receive a video (e.g., a moving image, etc.), audio (e.g., voice, music, etc.), and additional information (e.g., EPG, etc.) from outside of the electronic apparatus 200 according to the control by the processor 220. The input/output module 280 may include one of a High-Definition Multimedia Interface (HDMI) port 281, component jack 282, a PC port 283, and a Universal Serial Bus (USB) port 284. The input/output module 280 may include a combination of the HDMI port 281, the component jack 282, the PC port 283, and the USB port 284.

The user input module 290 may refer, for example, to a module used by a user to input data for controlling the electronic apparatus 200. For example, the user input module 290 may include a key pad, a dome switch, a touch pad, a jog wheel, a jog switch, and the like, but is not limited thereto.

The memory 210 according to an embodiment of the disclosure may store a program for processing and controlling by the processor 220, and may store data input to the electronic apparatus 200 or output from the electronic apparatus 200. Also, the memory 210 may store data necessary for operation of the electronic apparatus 200.

In addition, programs stored in the memory 210 may be classified into a plurality of modules according to their functions.

According to an embodiment of the disclosure, the memory 210 may include an authentication module 211 including one or more instructions for performing an authentication procedure between the display apparatus 100 and the electronic apparatus 200, and unique identification information 212 generated for an authentication process with the display apparatus 100.

The processor 220 may include various processing circuitry and control the overall operation of the electronic apparatus 200 and a signal flow between internal components of the electronic apparatus 200 and process data. The processor 220 may execute an OS (operation system) and various applications stored in the memory 210 when there is a user input or preset and stored conditions are satisfied.

In addition, the processor 220 may include an internal memory. In this case, at least one of data, programs, or instructions stored in the memory 210 may be stored in an internal memory (not shown) of the processor 220.

The block diagrams of the electronic apparatus 200 illustrated in FIGS. 2 and 3 are block diagrams illustrating example embodiments of the disclosure. Each component of the block diagrams may be integrated, added, or omitted according to the specifications of the electronic apparatus 200 that is actually implemented. For example, when necessary, two or more components may be combined into a single component, or a single component may be divided into two or more components. In addition, functions performed by each block are for explaining embodiments of the disclosure, and specific operations or devices thereof do not limit the scope of the disclosure.

FIG. 4 is a flowchart illustrating an example operation in a display apparatus, according to various embodiments.

Referring to FIG. 4, in operation 410, the display apparatus 100 may receive identification information of an electronic apparatus and unique identification information generated by the electronic apparatus, from the electronic apparatus connected through a first communication protocol. The first communication protocol may include short-range communication protocols such as BT, BLE, and P2P. The identification information of the electronic apparatus may indicate information for identifying the electronic apparatus 200, such as a name of the electronic apparatus, and the unique identification information may include a PIN (Personal Identification Number).

In operation 420, upon receiving a user input for accepting authentication in accordance with the identification information of the electronic apparatus, the display apparatus 100 may store the unique identification information received from the electronic apparatus. In detail, the display apparatus 100 may inquire of a user about whether to accept authentication of the electronic apparatus using the identification information of the electronic apparatus through various user interfaces. For example, the display apparatus 100 may inquire about whether to accept the authentication of the electronic apparatus while displaying the name of the electronic apparatus through a graphical user interface. According to the graphical user interface, the display apparatus 100 may receive a user input through a remote control device or a touch input. The display apparatus 100 may inquire about whether to accept the authentication of the electronic apparatus while displaying the name of the electronic apparatus through a voice guide. According to the voice guide, the display apparatus 100 may receive the user's voice input through a microphone. When a user input indicating that the user accepts authentication is received in response to the user interface, the display apparatus 100 may store the unique identification information received from the electronic apparatus 200. When a user input indicating that the user does not accept authentication is received in response to the user interface, the display apparatus 100 may transmit a command to discard the unique identification information to the electronic apparatus 200, together with a control signal indicating an authentication failure.

In operation 430, the display apparatus 100 may transmit the stored unique identification information to the electronic apparatus upon receiving an authentication request from the electronic apparatus connected through a second communication protocol. The second communication protocol may include short-range communication protocols such as BT, BLE, and P2P. As a communication channel is connected according to the second communication protocol, the display apparatus 100 may transmit the unique identification information of the electronic apparatus 200, received from and held by the electronic apparatus 200, to the electronic apparatus 200.

In operation 440, the display apparatus 100 may receive, from the electronic apparatus 200, a result of authentication performed based on the unique identification information transmitted to the electronic apparatus 200 and the unique identification information held by the electronic apparatus 200. The electronic apparatus 200 may perform authentication by comparing the unique identification information received from the display apparatus 100 and the unique identification information that is generated and held by itself, and when the two pieces of unique identification information match, the display apparatus 100 may receive, from the electronic apparatus 200, a control signal indicating an authentication success. When the two pieces of unique identification information do not match, the display apparatus 100 may receive a control signal indicating an authentication failure from the electronic apparatus 200.

Figure 5:
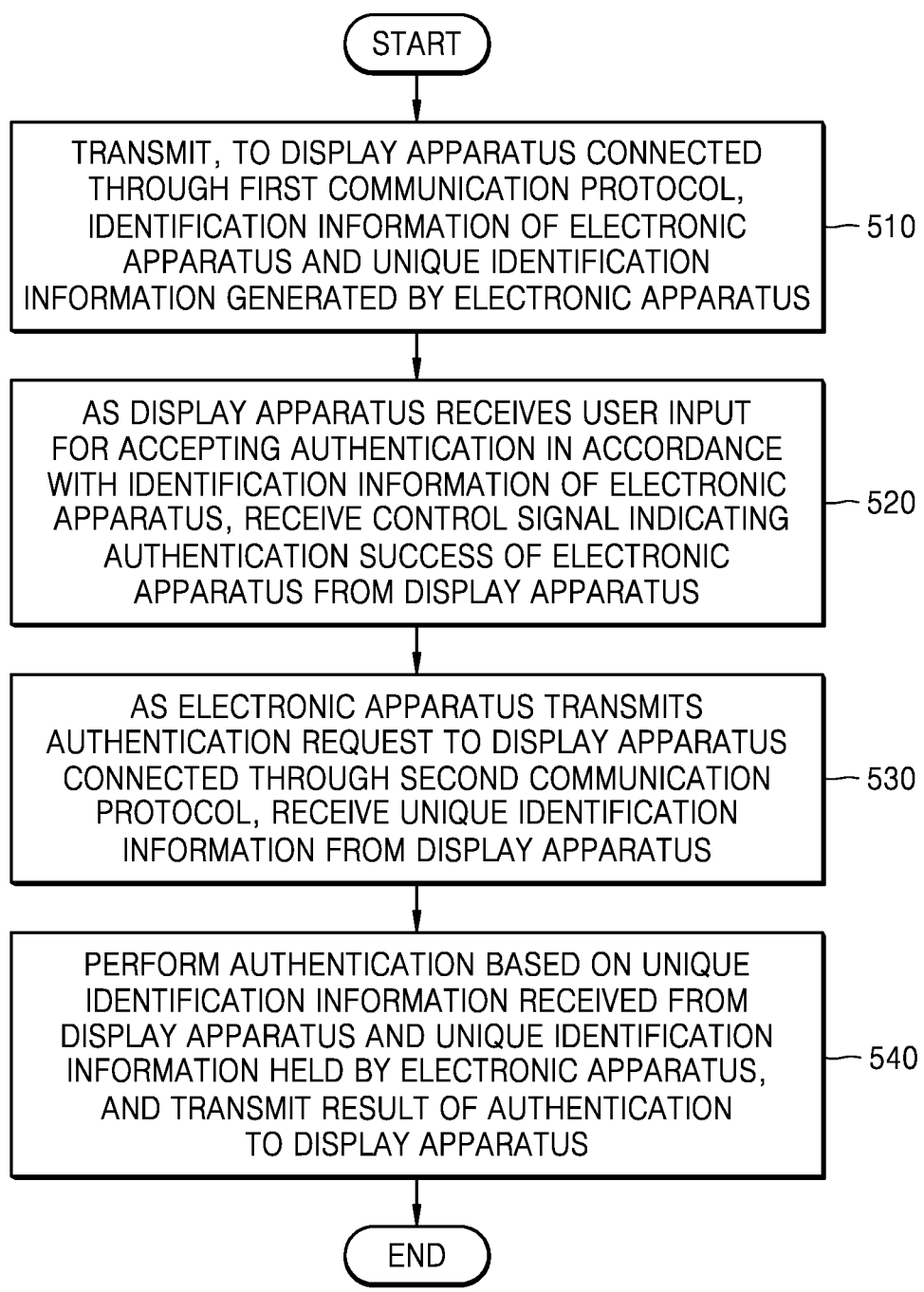
FIG. 5 is a flowchart illustrating an example operation in an electronic apparatus, according to various embodiments.

FIG. 5 is a flowchart illustrating an example operation in an electronic apparatus, according to various embodiments.

Referring to FIG. 5, in operation 510, the electronic apparatus 200 may transmit, to the display apparatus 100 connected through the first communication protocol, identification information of the electronic apparatus 200 and unique identification information generated by the electronic apparatus 200. The first communication protocol may include short-range communication protocols such as BT, BLE, and P2P. The identification information of the electronic apparatus may indicate information for identifying the electronic apparatus, such as a name of the electronic apparatus, and the unique identification information may include a PIN (Personal Identification Number).

In operation 520, as the display apparatus 100 receives a user input for accepting authentication in accordance with the identification information of the electronic apparatus 200, the electronic apparatus 200 may receive a control signal indicating an authentication success of the electronic apparatus, from the display apparatus 100. Upon receiving the control signal indicating the authentication success as above, the electronic apparatus 200 may store the unique identification information generated for authentication. When the electronic apparatus 200 has received a control signal indicating an authentication failure of the electronic apparatus from the display apparatus 100, the electronic apparatus 200 may discard the unique identification information that it has generated.

In operation 530, as the electronic apparatus 200 transmits an authentication request to the display apparatus 100 connected through the second communication protocol, the electronic apparatus 200 may receive the unique identification information from the display apparatus 100.

In operation 540, the electronic apparatus 200 may perform authentication based on the unique identification information received from the display apparatus 100 and the unique identification information held by the electronic apparatus 200, and may transmit a result of the authentication to the display apparatus 100. The electronic apparatus 200 may perform authentication by comparing the unique identification information received from the display apparatus 100 with the unique identification information that is generated and held by itself, and when the two pieces of unique identification information match, the electronic apparatus 200 may transmit a control signal indicating an authentication success to the display apparatus 100. When the two pieces of unique identification information do not match, the electronic apparatus 200 may transmit a control signal indicating an authentication failure to the display apparatus 100.

Figure 6:
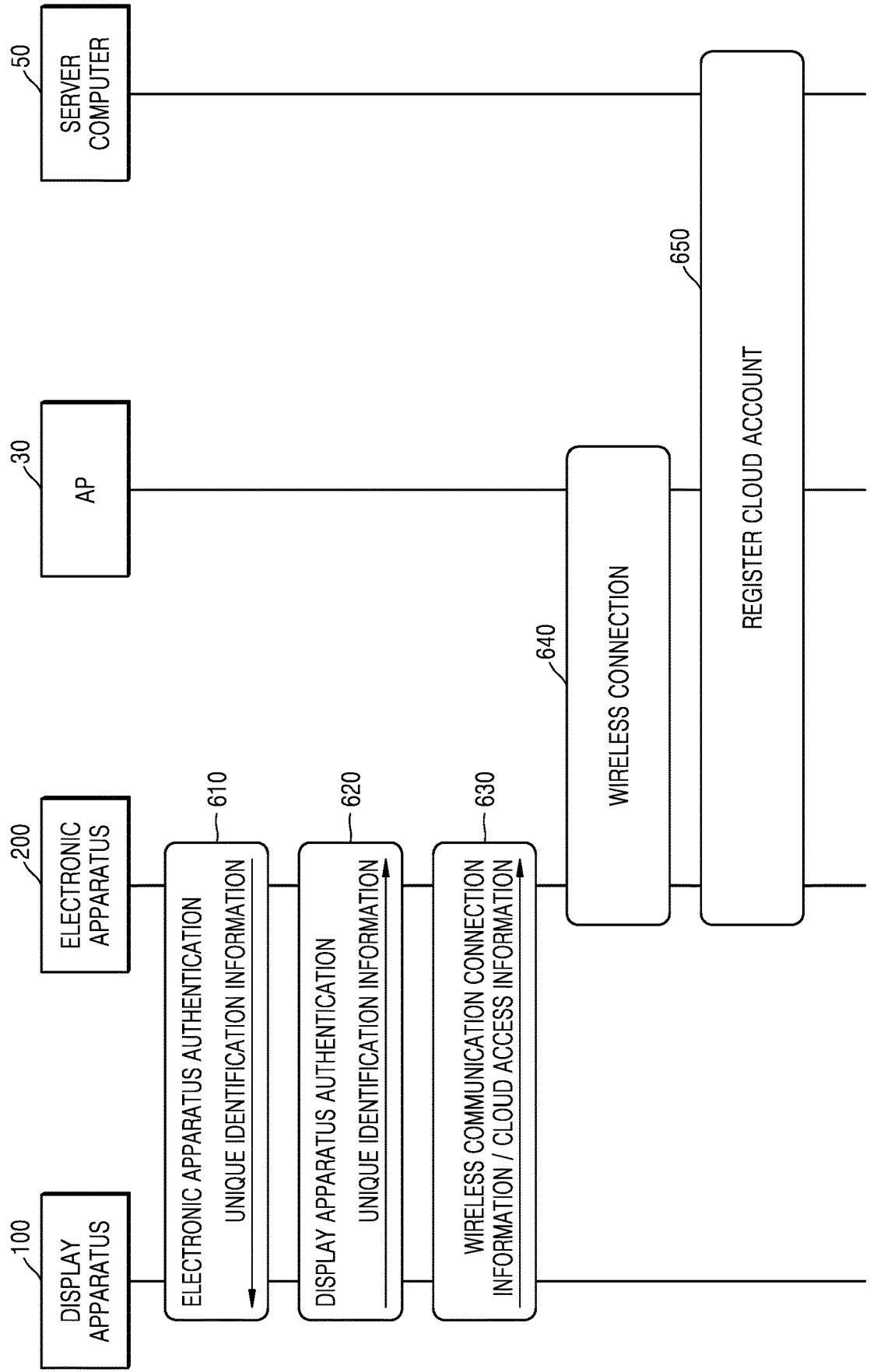
FIG. 6 is a signal flow diagram illustrating an example overall operation in a system disclosed according to various embodiments.

FIG. 6 is a signal flow diagram illustrating example overall operation in a system according to various embodiments.

Referring to FIG. 6, in operation 610, an electronic apparatus authentication may be performed between the display apparatus 100 and the electronic apparatus 200. In the electronic apparatus authentication, the display apparatus 100 performs authentication of the electronic apparatus 200. When the display apparatus 100 receives unique identification information from the electronic apparatus 200, the display apparatus 100 may inquire of a user about whether to accept authentication of the electronic apparatus by displaying a name of the electronic apparatus, and determine whether to authenticate the electronic apparatus 200 by receiving a response from the user. According to a user input indicating acceptance of the authentication of the electronic apparatus 200, the display apparatus 100 may store the unique identification information received from the electronic apparatus 200. The display apparatus 100 stores the unique identification information of the electronic apparatus 200 to use the same in a display apparatus authentication process 620 performed in a separate communication protocol. The electronic apparatus authentication may also be referred to as first authentication.

In operation 620, a display apparatus authentication may be performed between the display apparatus 100 and the electronic apparatus 200. In the display apparatus authentication, the electronic apparatus 200 performs authentication of the display apparatus 100, and the electronic apparatus 200 may receive the unique identification information that the display apparatus 100 had transmitted, compare the unique identification information received from the display apparatus 100 with the unique identification information that the electronic apparatus 200 itself was holding, to thereby determine whether to authenticate the display apparatus 100. When the unique identification information received from the display apparatus 100 and the unique identification information stored by the electronic apparatus 200 match, it may be determined that the authentication of the display apparatus 100 is successful, and when they do not match, it may be determined that the authentication of the display apparatus 100 has failed. For example, when the unique identification information received from the display apparatus 100 and the unique identification information stored by the display apparatus 100 do not match, it is determined that the display apparatus 100 is not a valid counterpart to which the electronic apparatus 200 has sent the unique identification information. The display apparatus authentication may also be referred to as second authentication.

In operation 630, the electronic apparatus 200 may obtain wireless communication connection information and cloud access information from the display apparatus 100. The wireless communication connection information is information required for the electronic apparatus 200 to access the AP 30, and may include a BSSID, a password, and the like. The cloud access information is information required to register the electronic apparatus 200 in a cloud account of the display apparatus 100 and may include information for accessing a server computer and cloud account information of the display apparatus 100.

According to an embodiment of the disclosure, the electronic apparatus 200 may obtain wireless communication connection information and cloud access information through a communication channel separate from the electronic apparatus authentication process 610 or the display apparatus authentication process 620. For example, the electronic apparatus 200 may obtain wireless communication connection information and cloud access information using the OCF protocol. For example, Wi-Fi Easy Setup of the OCF protocol is for easy Wi-Fi setup when an apparatus is used for the first time, and is an important step, especially for apparatuses that do not have a UI. Using this OCF protocol, the electronic apparatus 200 may receive wireless communication connection information such as Wi-Fi setting information from the display apparatus 100 through Bluetooth communication or Soft AP to perform initial AP setting, and may also receive cloud access information to perform apparatus registration.

According to an embodiment of the disclosure, the electronic apparatus 200 may obtain wireless communication connection information and cloud access information through at least one of the electronic apparatus authentication process 610 or the display apparatus authentication process 620.

In operation 640, the electronic apparatus 200 may perform an initial setting operation for connecting to the AP 30 using the wireless communication connection information obtained from the display apparatus 100.

In operation 650, the electronic apparatus 200 may register the electronic apparatus 200 itself in the cloud account of the display apparatus 100 registered in the server computer 50 using the cloud access information obtained from the display apparatus 100.

Figure 7:
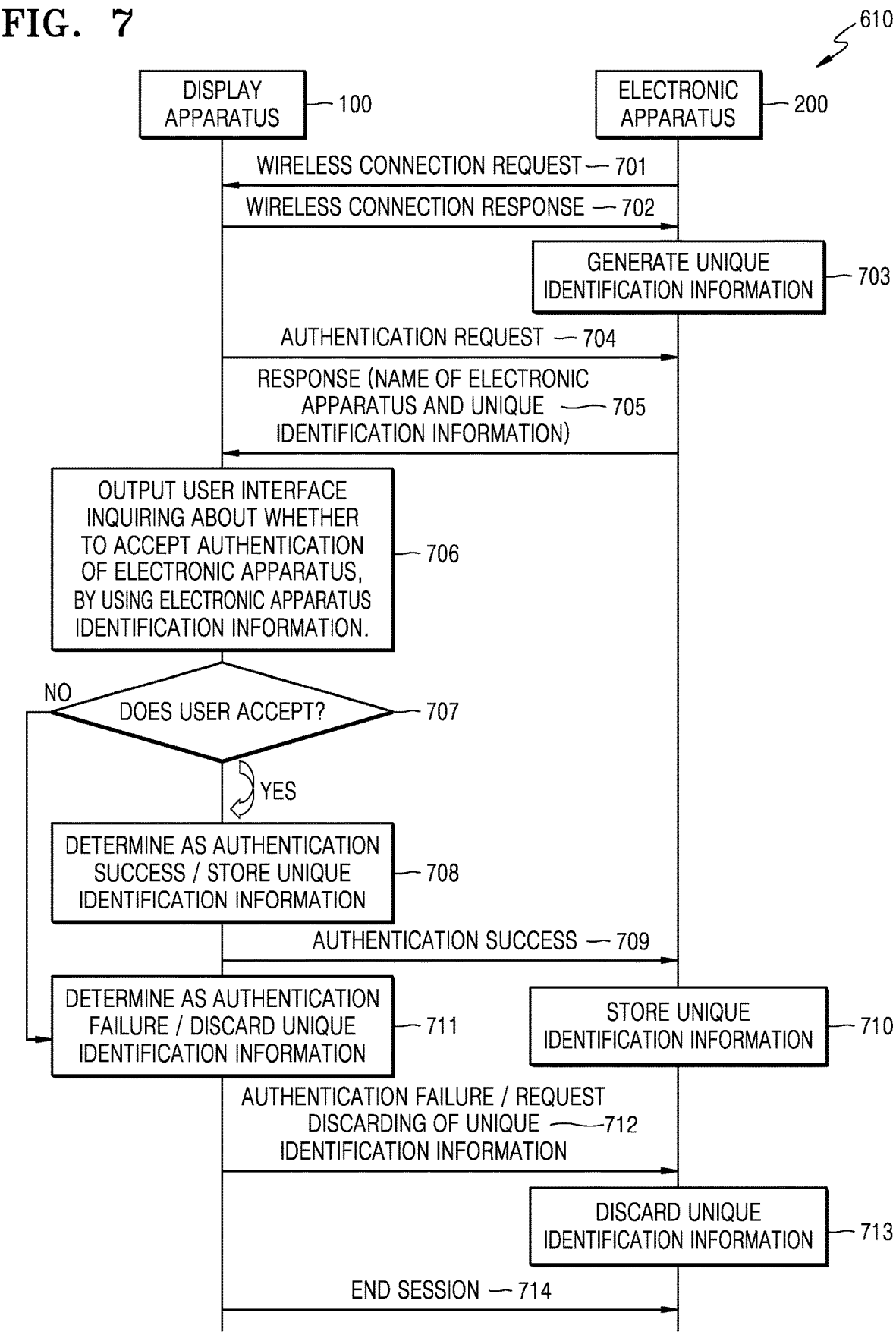
FIG. 7 is a signal flow diagram illustrating an example process of electronic apparatus authentication, according to various embodiments.

FIG. 7 is a signal flow diagram illustrating an example of a process of electronic apparatus authentication (first authentication), according to various embodiments.

Referring to FIG. 7, in operation 701, the electronic apparatus 200 may transmit a wireless connection request to the display apparatus 100, and in operation 702, the display apparatus 100 may complete wireless connection to the electronic apparatus 200 by responding to the wireless connection request. For example, the display apparatus 100 may be a TV, the electronic apparatus 200 may be a soundbar, and authentication as illustrated in FIG. 7 may be performed in a soundbar OOBE setup situation through the TV. Examples of a wireless protocol used in wireless communication may be BT/BLE Profile, or P2P profile. For example, the soundbar may find a TV and connect to it using wireless protocol 1 (SPP: Serial Port Profile). Here, the soundbar is a master (client) and the TV is a slave (server).

In operation 703, when a session is established, the electronic apparatus 200 may generate unique identification information.

In operation 704, when the electronic apparatus 200 receives an authentication request from the display apparatus 100, in operation 705, the electronic apparatus 200 may transmit, to the display apparatus 100, the generated unique identification information and identification information of the electronic apparatus 200 such as the name of the electronic apparatus 200. For example, when a session is established, an 8-digit decimal random PIN may be generated and stored by the soundbar, and a name of the soundbar and an 8-digit PIN may be sent to the TV through the session. The name of the soundbar may be, for example, [Samsung] Soundbar.

In operation 706, the display apparatus 100 may output a user interface inquiring about whether to accept authentication of the electronic apparatus, using the electronic apparatus identification information. The electronic apparatus 100 may generate a user interface using identification information of the electronic apparatus received from the electronic apparatus 200 in order for a user to specify which apparatus is to authenticate. The display apparatus 100 may inquire of the user about whether to accept the authentication through various user interfaces. According to an example, the display apparatus 100 may display a graphical user interface on a display to inquire of the user about whether to accept authentication of the electronic apparatus. For example, the display apparatus 100 may display a graphical user interface including a message <Do you want to accept authentication of the electronic apparatus \*\*\*?> on the display. According to an example, the display apparatus 100 may inquire of the user about whether to accept authentication of the electronic apparatus through an audio interface. For example, the display apparatus 100 may output a voice utterance <Do you want to accept authentication of the electronic apparatus \*\*\*?> through a speaker.

In operation 707, the display apparatus 100 may receive a user input in response to a user interface inquiring about whether to accept authentication of the electronic apparatus, and may determine whether the user has accepted, based on the received user input. When the user accepts, the process is proceeded to operation 708, and when there is no user acceptance, the process is proceeded to operation 711.

In operation 708, when a user input indicating acceptance by the user is received, the display apparatus 100 may determine that authentication of the electronic apparatus 200 has been successful and store the unique identification information received from the electronic apparatus 200. Storing the unique identification information of the electronic apparatus 200 is for later use when authenticating the display apparatus 100 from the electronic apparatus 200.

In operation 709, the display apparatus 100 may transmit a control signal indicating an authentication success to the electronic apparatus 200.

In operation 710, the electronic apparatus 200 that has received the control signal indicating the authentication success may determine to store the unique identification information generated in operation 703.

In operation 711, when a user input indicating that the user does not accept is received, the display apparatus 100 may determine that authentication of the electronic apparatus 200 has failed and may discard the unique identification information of the electronic apparatus 200.

In operation 712, the display apparatus 100 may transmit a unique identification information discard request command to the electronic apparatus 200 together, with the control signal indicating the authentication failure.

In operation 713, the electronic apparatus 200 that has received the unique identification information discard request command together with the control signal indicating the authentication failure may discard the generated unique identification information.

In operation 714, the session may be ended.

Figure 8:
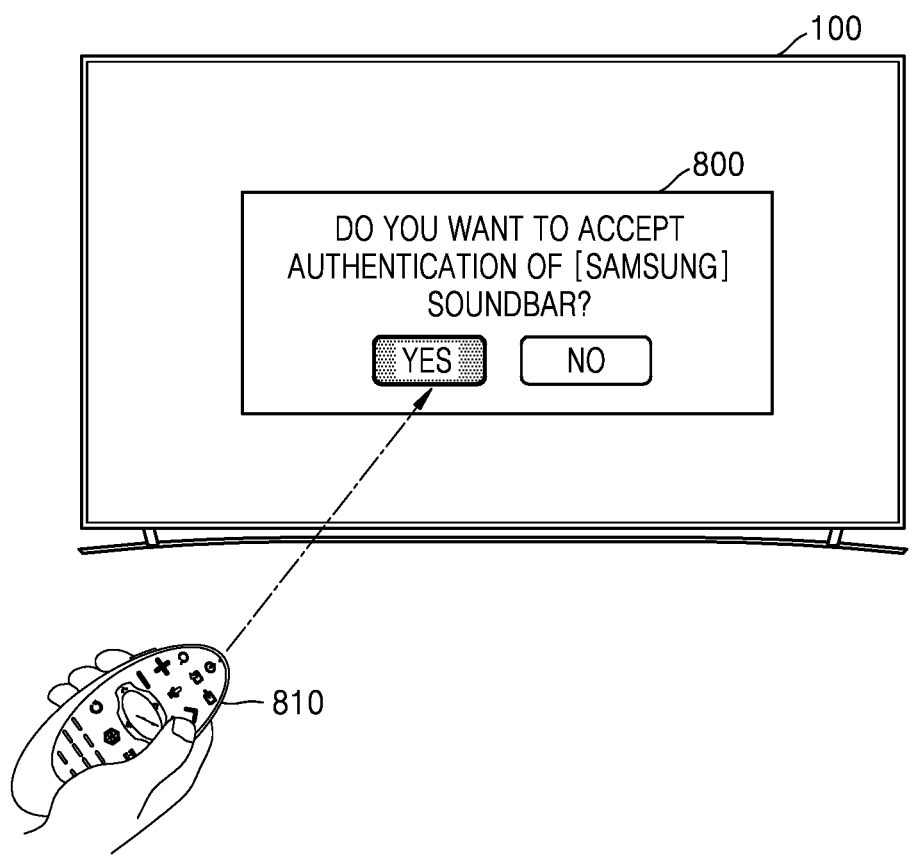
FIG. 8 is a diagram illustrating an example of a graphical user interface of a display apparatus, for inquiring whether to accept authentication of an electronic apparatus, according to various embodiments.

FIG. 8 is a diagram illustrating an example of a graphical user interface of a display apparatus, for inquiring whether to accept authentication of an electronic apparatus, according to various embodiments.

Referring to FIG. 8, when the display apparatus 100 is a TV and the electronic apparatus 200 is a soundbar, the TV may display a name of the soundbar on a display screen and display a YES/NO pop-up window 800 inquiring about whether the soundbar is an apparatus to be set up. For example, when the name of the soundbar is [Samsung] Soundbar, the TV may display the pop-up window 800 saying <Do you want to accept authentication of [Samsung] Soundbar?>. When the user selects Yes using a remote control device 810, it may be determined that authentication of the soundbar is accepted, and when the user selects No, it may be determined that authentication of the soundbar is not accepted.

Figure 9:
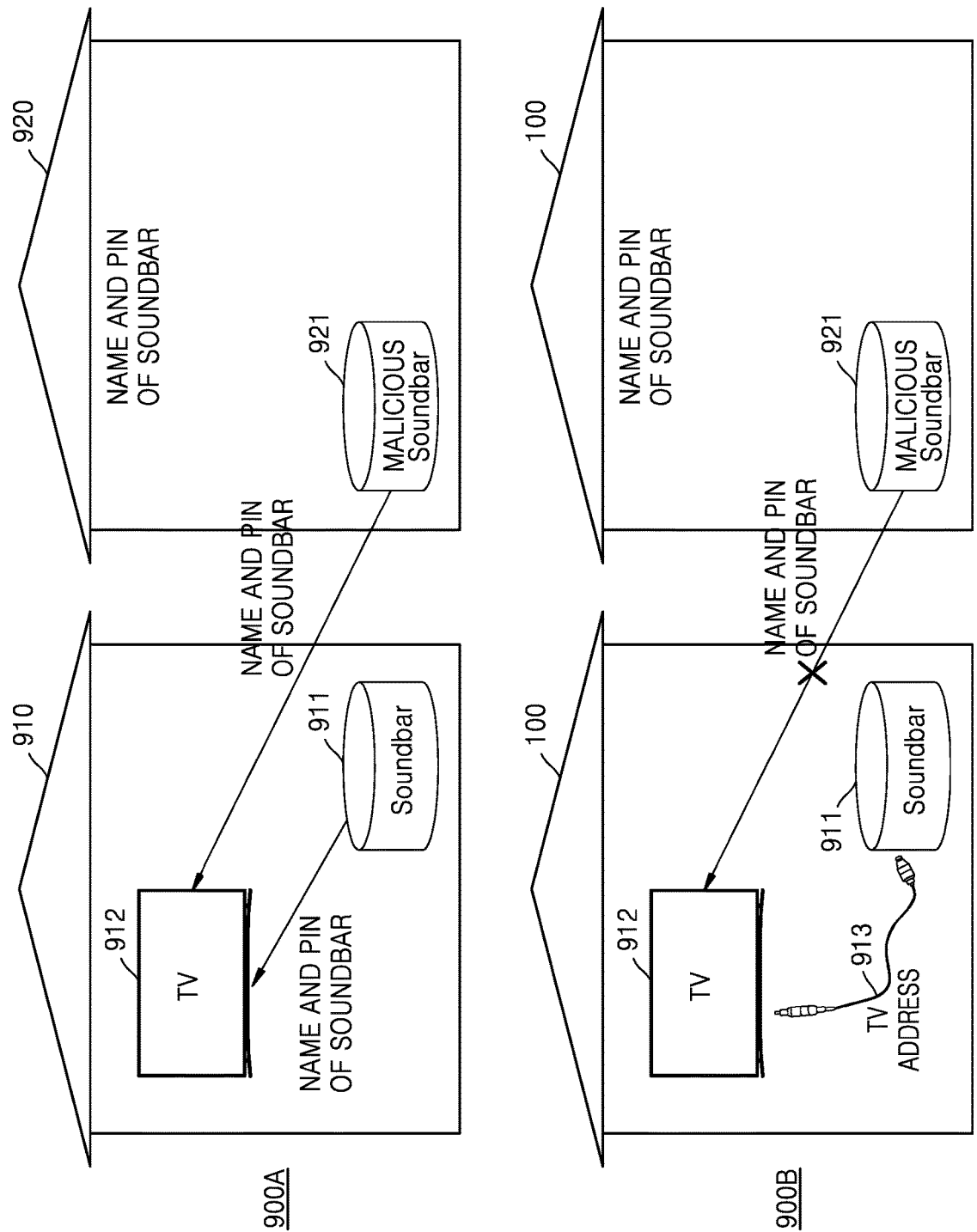
FIG. 9 is a diagram illustrating an example problem that may occur when an electronic apparatus is authenticated using only a name of the electronic apparatus, according to an example.

FIG. 9 is a diagram illustrating an example problem that may occur when an electronic apparatus is authenticated using only a name of the electronic apparatus, according to an example.

Referring to FIG. 9, when an OOBE setup for a soundbar 911 is to be performed using a TV 912 in a home environment 910, the soundbar 911 may request authentication by sending its soundbar name and PIN to the TV 912. However, when a short range communication protocol such as Bluetooth is used, a soundbar (malicious soundbar) 921 located nearby in a neighbor's home environment 920 may also send the name of the soundbar and PIN to the TV 912. In this case, when the soundbar 911 and the malicious soundbar 921 have the same name, a user of the home environment 910 may also accept an authentication request from the malicious soundbar 921.

To prevent and/or reduce the occurrence of the above situation, when setting up the soundbar OOBE for the first time, the TV 912 and the soundbar 911 may be connected to each other via an optical cable 913, and the TV 912 may transmit an MAC address of the TV 912 to the soundbar 911 through the optical cable and may allow the soundbar to connect via communication using the TV's MAC address (Media Access Control address), thereby preventing and/or reducing occurrence of the malicious soundbar 921 from receiving the the name of the soundbar and PIN. The optical cable 913 may perform communication according to, for example, a Sony/Philips digital interface (SPDIF) standard. The display apparatus 100 according to an embodiment of the disclosure may transmit an audio signal 102 to the electronic apparatus 200 through one-way communication. For example, the display apparatus 100 may transmit the audio signal 102 to the electronic apparatus 200 using communication according to the Sony/Philips digital interface (SPDIF) standard. The display apparatus 100 and the electronic apparatus 200 may be connected by an SPDIF cable, and the SPDIF cable may be in the form of a coaxial cable or an optical fiber cable.

Figure 10:
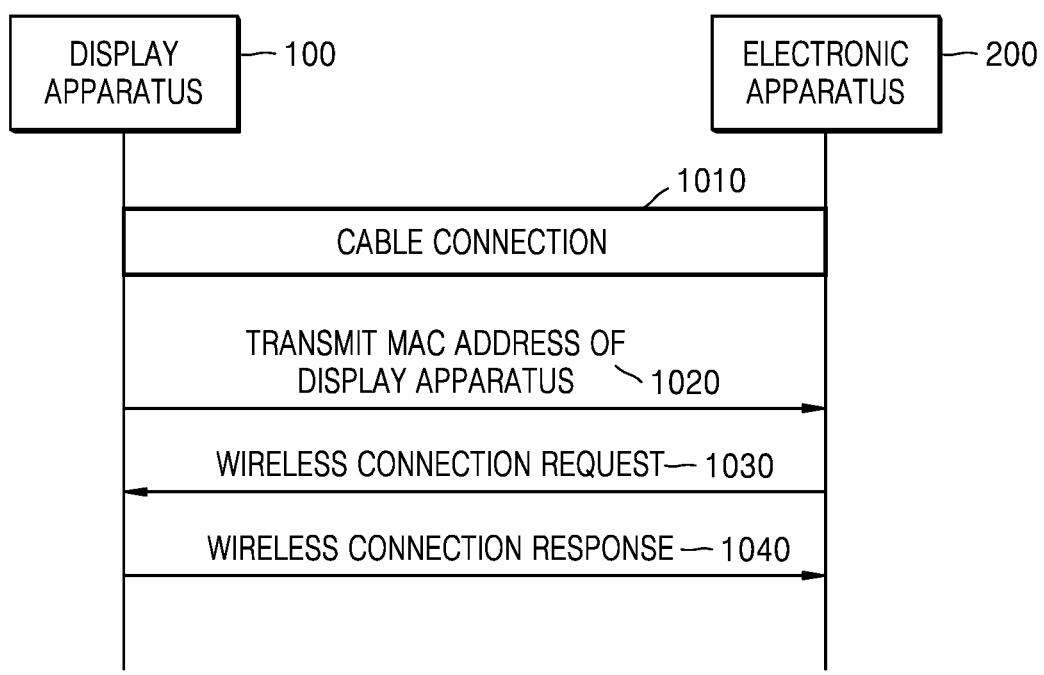
FIG. 10 is a signal flow diagram illustrating an example of performing a procedure for electronic apparatus authentication after connecting a cable between a display apparatus and an electronic apparatus, according to various embodiments.

FIG. 10 is a signal flow diagram illustrating an example of performing a procedure for electronic apparatus authentication after connecting a cable between the display apparatus 100 and the electronic apparatus 200, according to various embodiments.

Referring to FIG. 10, in operation 1010, a cable is connected between the display apparatus 100 and the electronic apparatus 200. The cable may, for example, perform communication according to the Sony/Philips digital interface (SPDIF) standard. The Sony/Philips digital interface (SPDIF) standard may, for example, include an optical cable or a coaxial cable.

In operation 1020, the electronic apparatus 200 may receive an MAC address of the display apparatus 100 from the display apparatus 100 according to the cable connection.

In operation 1030, the electronic apparatus 200 may transmit a wireless connection request to the display apparatus 100 using the received MAC address of the display apparatus 100.

In operation 1040, the display apparatus 100 may transmit a wireless connection response to the electronic apparatus 200 in response to the wireless connection request.

As illustrated in FIG. 10, instead of using a broadcast or the like when establishing a wireless connection between the display apparatus 100 and the electronic apparatus 200, the display apparatus 100 provides its MAC address to the electronic apparatus 200 and a wireless connection is established using the designated MAC address, thereby preventing and/or reducing a likelihood of an authentication request from a malicious electronic apparatus.

Figure 11:
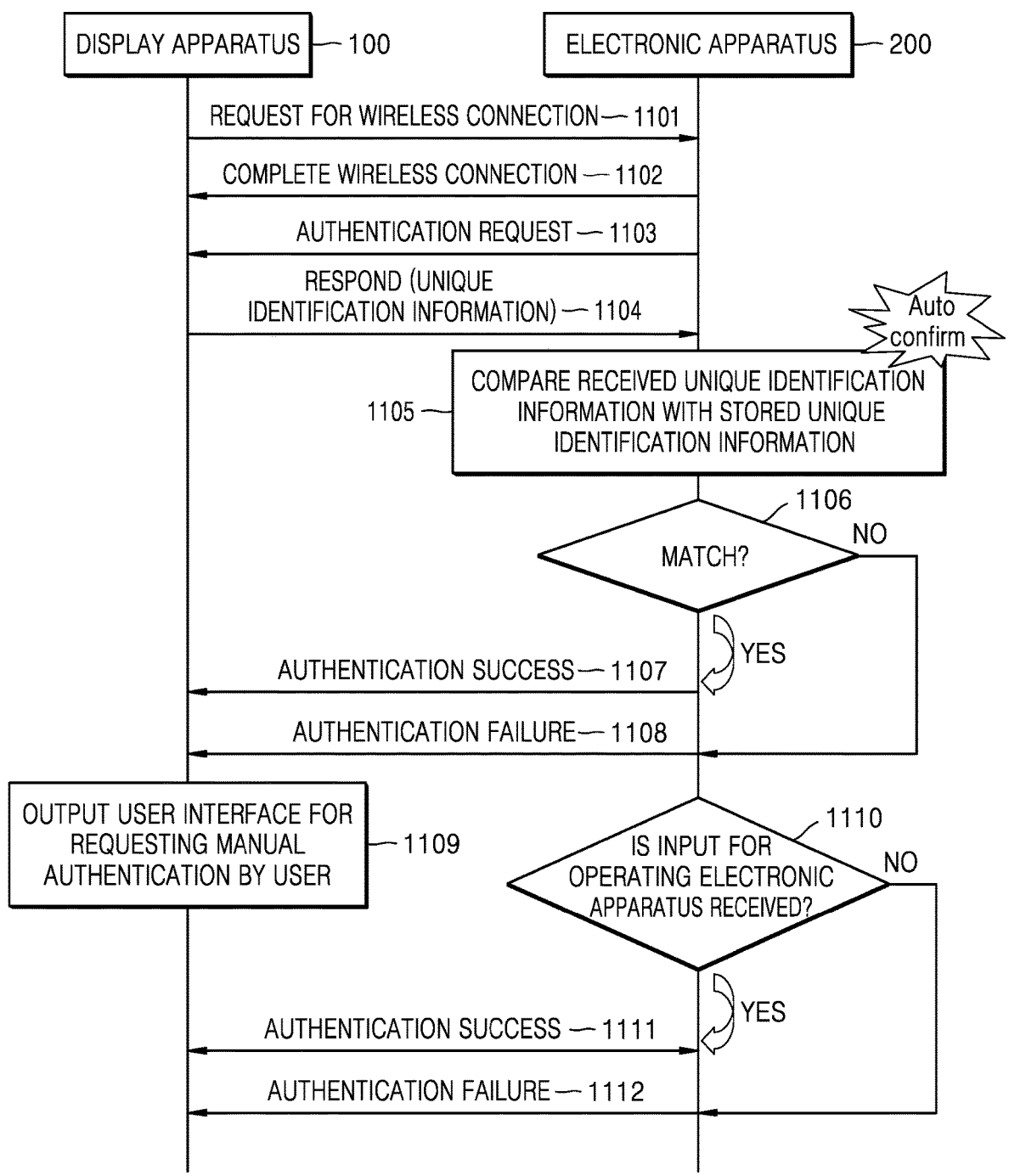
FIG. 11 is a signal flow diagram illustrating an example of a process of display apparatus authentication (second authentication), according to various embodiments.

FIG. 11 is a signal flow diagram illustrating an example of a process of display apparatus authentication (second authentication), according to various embodiments.

Referring to FIG. 11, in operation 1101, the display apparatus 100 transmits a wireless connection request to the electronic apparatus 200, and in operation 1102, the electronic apparatus 200 responds to the wireless connection request to complete a wireless connection to the display apparatus 100. Examples of a wireless protocol used in wireless communication may be BT/BLE Profile, or P2P profile. For example, the display apparatus 100 may establish a communication channel using a wireless protocol 2 (GATT: Generic Attribute Profile).

In operation 1103, the electronic apparatus 200 may transmit an authentication request to the display apparatus 100.

In operation 1104, the display apparatus 100 that has received the authentication request from the electronic apparatus 200 may transmit the unique identification information that the display apparatus 100 has received from the electronic apparatus 200 during the first authentication and stored, to the electronic apparatus 200.

In operation 1105, the electronic apparatus 200 that has received the unique identification information from the display apparatus 100 may perform auto confirmation using the unique identification information without user intervention. That is, the electronic apparatus 200 may compare the unique identification information received from the display apparatus 100, with unique identification information that the electronic apparatus 100 itself has generated and stored in the first process and determine whether the two pieces of unique identification information match. To this end, the electronic apparatus 200 may manage a validity period of unique identification information. The electronic apparatus 200 may set a validity period of unique identification information and manage such that the unique identification information is discarded when the set validity period is passed. For example, when the electronic apparatus 200 has set a validity period to 20 seconds, the unique identification information generated by the electronic apparatus 200 may be automatically discarded after 20 seconds and the electronic apparatus 200 may no longer store the unique identification information, the validity period of which has passed. Accordingly, when the unique identification information received from the display apparatus 100 does not match the unique identification information stored by the electronic apparatus 200 itself, the electronic apparatus 200 may determine that the display apparatus 100 is not a valid counterpart. Alternatively, when the validity period has passed and the unique identification information is discarded, the electronic apparatus 200 may not be able to find the same unique identification information as the unique identification information received from the display apparatus 100. In this case, also, the electronic 200 may determine that the display apparatus 100 is not a valid counterpart. As described above, by comparing the unique identification information generated and transmitted by the electronic apparatus 200 itself with the unique identification information held by the electronic apparatus 200, the electronic apparatus 200 may determine, without user intervention, whether the display apparatus 100 that has currently transmitted the unique identification information is the display apparatus 100 to which the electronic apparatus 200 has previously transmitted the unique identification information to, and may determine whether to authenticate the display apparatus 100. This process may be referred to, for example, as "auto confirm."

In operation 1106, the electronic apparatus 200 may determine whether the unique identification information received from the display apparatus 100 matches the unique identification information it has stored, and when the two pieces of unique identification information match, the process may proceed to operation 1107, otherwise to operation 1108.

In operation 1107, when the two pieces of unique identification information match, the electronic apparatus 200 may transmit a control signal indicating an authentication success to the display apparatus 100. According to the control signal indicating the authentication success, the electronic apparatus 200 may give an access control authority to the display apparatus 100.

In operation 1108, when the two pieces of unique identification information do not match, the electronic apparatus 200 may transmit a control signal indicating an authentication failure to the display apparatus 100.

In operation 1109, when receiving a control signal indicating an authentication failure from the electronic apparatus 200, the display apparatus 100 may output a user interface for requesting manual authentication by the user.

For example, when auto-confirmation fails based on unique identification information in the electronic apparatus 200, by inducing manual authentication by the user one more time, instead of immediately terminating the authentication procedure, the authentication procedure may be completed when there is a user's confirmation. The user interface requesting the user's manual authentication may include a pop-up window including a message commanding to perform a user input to operate the electronic apparatus when the user wants to authenticate the display apparatus in the electronic apparatus.

Figure 12:
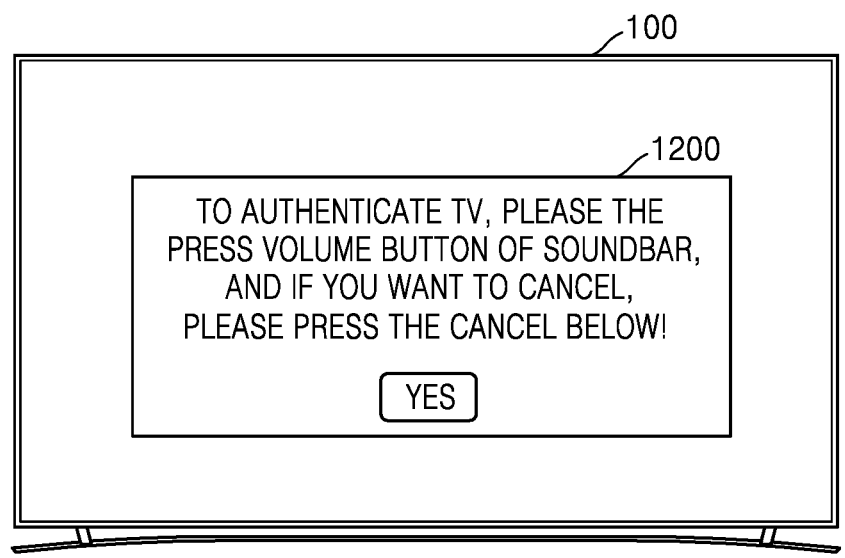
FIG. 12 is a diagram illustrating an example of a user interface for inducing manual authentication by a user, according to various embodiments.

FIG. 12 is a diagram illustrating an example of a user interface for inducing manual authentication by a user, according to various embodiments.

Referring to FIG. 12, when the display apparatus 100 is a TV and the electronic apparatus 200 is a soundbar, the TV may output a pop-up window 1200 <Please press the volume button of the soundbar to authenticate TV or select the cancel button below if you want to cancel>.

Referring back to FIG. 11, in operation 1110, in response to the manual authentication induction user interface output of the display apparatus 100, it may be determined whether the electronic apparatus 200 has received an input for operating the electronic apparatus.

In operation 1111, as a result of determination in operation 1110, when an input for operating the electronic apparatus is received, it may be determined as an authentication success, and a control signal indicating the authentication success may be transmitted to the display apparatus 100.

In operation 1112, as a result of determination, when an input for operating the electronic apparatus is not received, it may be determined as an authentication failure, and a control signal indicating the authentication failure may be transmitted to the display apparatus 100.

Figure 13:
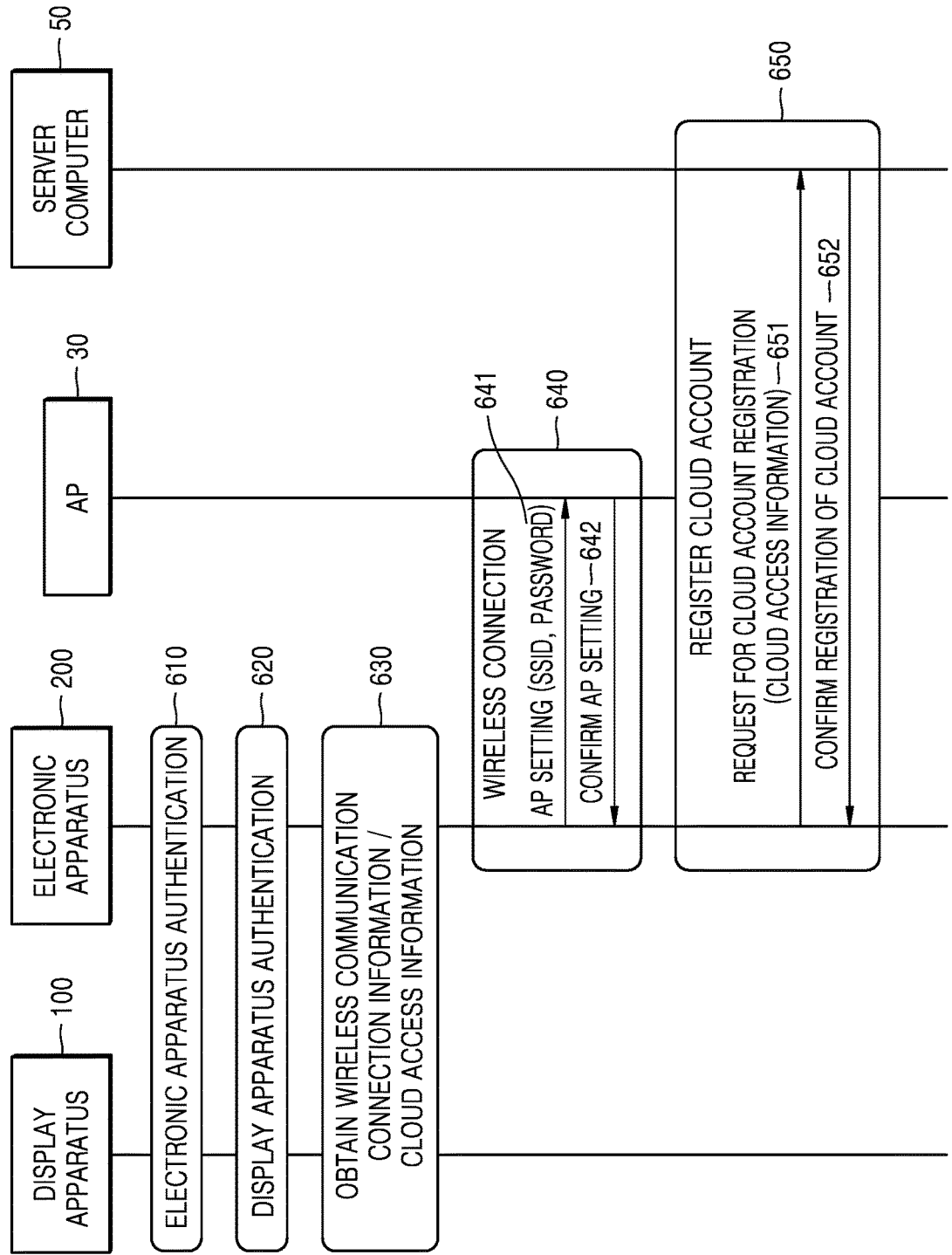
FIG. 13 is a signal flow diagram illustrating an example of a cloud account registration process in a system disclosed according to various embodiments.

FIG. 13 is a signal flow diagram illustrating an example of a cloud account registration process in a system disclosed according to various embodiments.

Referring to FIG. 13, after completion of an electronic apparatus authentication process (first authentication) 610 for authenticating the electronic apparatus 200 by the display apparatus 100 and a display apparatus authentication process (second authentication) 620 for authenticating the display apparatus 100 by the electronic apparatus 200, in operation 630, the electronic apparatus 200 may obtain wireless communication connection information and cloud access information through a separate communication channel.

In operation 630, the electronic apparatus 200 may obtain wireless communication connection information and cloud access information from the display apparatus 100. The wireless communication connection information is information required for the electronic apparatus 200 to access the AP 30, and may include a BSSID, a password, and the like. The cloud access information is information for registering the electronic apparatus 200 in the cloud account of the display apparatus 100 and may include information for accessing a server computer and cloud account information of the display apparatus 100.

According to an embodiment of the disclosure, the electronic apparatus 200 may obtain wireless communication connection information and cloud access information through a communication channel separate from the electronic apparatus authentication process 610 or the display apparatus authentication process 620. For example, the electronic apparatus 200 may obtain wireless communication connection information and cloud access information using the OCF protocol. For example, Wi-Fi Easy Setup of the OCF protocol is for easy Wi-Fi setup when an apparatus is used for the first time, and is an important step, especially for apparatuses that do not have a UI. Using this OCF protocol, the electronic apparatus 200 may receive wireless communication connection information such as Wi-Fi setting information from the display apparatus 100 through Bluetooth communication or Soft AP to perform initial AP setting, and may also receive cloud access information to perform apparatus registration.

According to an embodiment of the disclosure, the electronic apparatus 200 may obtain wireless communication connection information and cloud access information through at least one of the electronic apparatus authentication process 610 or the display apparatus authentication process 620. For example, the electronic apparatus 200 may receive wireless communication connection information from the display apparatus 100 through the electronic apparatus authentication process 610 and may receive cloud access information from the display apparatus 100 through the display apparatus authentication process 620.

In operation 640, the electronic apparatus 200 may perform an initial setting operation for connecting to the AP 30 using the wireless communication connection information obtained from the display apparatus 100.

For example, in operation 641, the electronic apparatus 200 may set an AP using wireless communication connection information received from the display apparatus 100, for example, information required to access the AP 30, such as a BSSID, a password, and the like.

In operation 642, the electronic apparatus 200 may complete AP setting by receiving an AP setting confirmation.

In operation 650, the electronic apparatus 200 may register the electronic apparatus 200 itself in the cloud account of the display apparatus 100 registered in the server computer 50 using the cloud access information obtained from the display apparatus 100. The cloud access information is information required to register the electronic apparatus 200 in a cloud account of the display apparatus 100 and may include information for accessing a server computer and cloud account information of the display apparatus 100. The information for accessing a server computer may include address information of the server computer. The cloud account information of the display apparatus may include an identifier (ID) and a password of the cloud account.

For example, in operation 651, the electronic apparatus 200 may access the server computer 50 using the cloud access information of the display apparatus 100, and transmit a registration request regarding the electronic apparatus 200 to the cloud account of the display apparatus 100 by providing the cloud account information of the display apparatus 100 and identification information and address information of the electronic apparatus 200 itself to the server computer 50. According to the registration request described above, the server computer 50 may register the electronic apparatus 200 in the cloud account of the display apparatus 100.

In operation 652, the server computer 50 may complete cloud account registration by transmitting a cloud account registration confirmation signal to the electronic apparatus 200.

Figure 14:
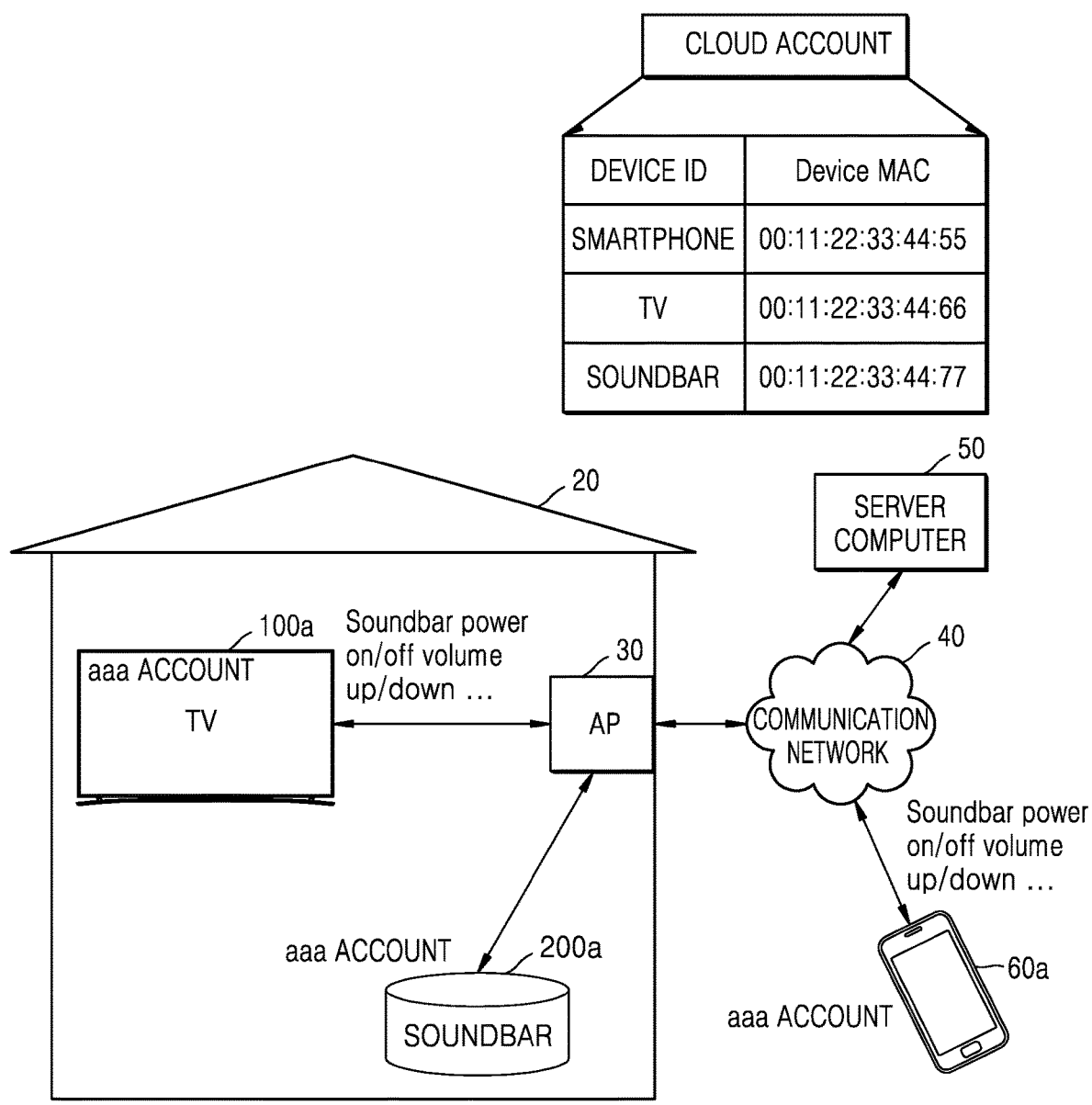
FIG. 14 is a diagram illustrating an example operation of controlling an electronic apparatus, by a display apparatus, via account registration in a cloud server, according to various embodiments.

FIG. 14 is a diagram illustrating an example operation of controlling an electronic apparatus, by a display apparatus, via account registration in a cloud server, according to various embodiments.

Referring to FIG. 14, in the cloud server computer 50, a smartphone 60*a*, a TV 100*a*, and a soundbar 200*a* are registered in a cloud account aaa.

Therefore, when a TV 100*a* accesses the server computer 50 and transmits a control command such as a soundbar power on/off, a volume up/down, and the like, the server computer 50 may transmit a control signal such as a soundbar power on/off, a volume up/down, etc. to a soundbar 200*a* according to the control command.

In addition, even in the case of a smart phone 60*a* that is outside the home environment 20, when accessing the server computer 50 and transmitting a control command such as a soundbar power on/off, a volume up/down, etc., the server computer 50 may transmit a control signal such as a soundbar power on/off, a volume up/down, etc. to the soundbar 200*a* according to the control command.

Various embodiments of the disclosure may also be implemented in the form of a non-transitory computer-readable recording medium including instructions executable by a computer, such as a program module executed by a computer. Computer-readable media can be any available media that can be accessed by a computer and includes both volatile and nonvolatile media, removable and non-removable media. Also, computer-readable media may include computer storage media. Computer storage media includes both volatile and nonvolatile, removable and non-removable media implemented in any method or technology for storage of information such as computer readable instructions, data structures, program modules or other data.

The disclosed embodiments may be implemented as S/W program including instructions stored in a computer-readable storage medium.

A computer may refer, for example, to a device capable of calling a stored instruction from a storage medium and performing an operation according to the disclosed embodiment according to the called instruction, and may include a display apparatus or an electronic apparatus according to the disclosed embodiment.

A computer-readable storage medium can be provided in the form of a non-transitory storage medium. Here, the 'non-transitory' storage medium may not include a signal and is tangible but does not distinguish whether data is semi-permanently or temporarily stored in the storage medium.

A control method according to the disclosed embodiments may be included in a computer program product and provided in that form. Computer program products can be traded between sellers and buyers as commodities.

The computer program products may include an S/W program, a computer-readable storage medium in which the S/W program is stored. For example, the computer program product may include a product (e.g., a downloadable app) in the form of an S/W program distributed electronically through a device manufacturer or an electronic market (e.g., Google Play Store, App Store). For electronic distribution, at least a portion of an S/W program may be stored in a storage medium or may be temporarily generated. In this case, the storage medium may be a storage medium of a server of a manufacturer, a server of an electronic market, or a relay server temporarily storing a SW program.

In a system including a server and a device, the computer program product may include a storage medium of the server or a storage medium of the device. When there is a third device (e.g., a smartphone) that is connected to the server or the device through communication, the computer program product may include a storage medium of the third device. The computer program product may include S/W program itself transmitted from the server to the device or the third device, or transmitted from the third device to the device.

In this case, one of the server, the device, and the third device may execute a computer program product to perform the method according to the disclosed embodiments. Two or more of the server, the device, and the third device may execute a computer program product to implement the method according to the disclosed embodiments in a distributed manner.

For example, a server (e.g., a cloud server or an artificial intelligence server) may execute a computer program product stored in the server to control a device communicatively connected with the server to perform the method according to the disclosed embodiments.

As another example, the third device may execute a computer program product to control the device connected to the third device through communication to perform the method according to the disclosed embodiments. When the third device executes a computer program product, the third device may download the computer program product from the server and execute the downloaded computer program product. The third device may execute a computer program product provided in a pre-loaded state to perform the method according to the disclosed embodiments.

In addition, in the present disclosure, "unit" may include a hardware component such as a processor or a circuit, and/or a software component executed by a hardware component such as a processor.

While the disclosure has been illustrated and described with reference to various example embodiments, it will be understood that the various example embodiments are intended to be illustrative, not limiting. It will be further understood by those of ordinary skill in the art that various changes in form and detail may be made therein without departing from the true spirit and full scope of the disclosure, including the appended claims and their equivalents.

The scope of the disclosure is defined not by the detailed description, and all differences within the scope will be construed as being included in the disclosure.

What is claimed is:

1. A display apparatus comprising:
a communication interface comprising communication circuitry;
memory storing one or more instructions; and
at least one processor including processing circuitry,
wherein the one or more instructions that, when executed by the at least one processor individually or collectively, causes the display apparatus to:
in response to transmitting a first authentication request to an electronic apparatus connected through a first communication protocol, receive, from the electronic apparatus, electronic apparatus identification information for identifying the electronic apparatus and unique identification information generated by the electronic apparatus, in response to receiving a user input for accepting a first authentication in accordance with the electronic apparatus identification information, perform a first authentication for the electronic apparatus by storing the unique identification information received from the electronic apparatus and transmit, to the electronic apparatus through the first communication protocol, a control signal indicating a success of the first authentication, in response to receiving a second authentication request from the electronic apparatus connected through a second communication protocol different from the first communication protocol, control the communication interface to transmit, to the electronic apparatus, the unique identification information which is stored in the display apparatus during the first authentication, receive, from the electronic apparatus, a control signal indicating a success of a second authentication which is performed by the electronic apparatus based on the unique identification information transmitted from the display apparatus being identical to the unique identification information generated by and stored in the electronic apparatus, and according to a success of mutual authentication between the display apparatus and the electronic apparatus by the success of the first authentication and the success of the second authentication, control the communication interface to transmit, to the electronic apparatus, wireless communication connection information of the display apparatus which is used by the electronic apparatus for connecting to an access point.

2. The display apparatus of claim 1, wherein the one or more instructions that, when executed by the least one processor individually or collectively, causes the display apparatus to:

output a graphical user interface for inquiring about whether the electronic apparatus identification information is authenticated, store the unique identification information in response to an input for accepting authentication of the electronic apparatus, and discard the unique identification information in response to an input indicating that authentication of the electronic apparatus is not accepted.

3. The display apparatus of claim 1, wherein the one or more instructions that, when executed by the at least one processor individually or collectively, causes the display apparatus to receive the control signal indicating a failure of the second authentication from the electronic apparatus based on the unique identification information transmitted by the display apparatus not corresponding to the unique identification information stored in the electronic apparatus, and in response to receiving the control signal indicating the failure of the second authentication, output a graphical user interface for requesting manual authentication.

4. The display apparatus of claim 3, wherein the graphical user interface for requesting manual authentication comprises a message guiding to operate a specified function of the electronic apparatus to accept authentication of the display apparatus.

5. The display apparatus of claim 1, wherein the one of more instructions that, when executed by the at least one processor individually or collectively, causes the display apparatus to, in response to receiving the control signal indicating the success of the second authentication from the electronic apparatus, control the communication interface to transmit, to the electronic apparatus, cloud access information used in accessing a cloud account of the display apparatus registered in a server computer.

6. The display apparatus of claim 1, wherein an authentication operation between the display apparatus and the electronic apparatus is performed based on the success of the first authentication and the success of the second authentication by the user input indicating the acceptance of a user during the first authentication for authenticating the electronic apparatus by the display apparatus to cause the second authentication for authenticating the display apparatus by the electronic apparatus to be automatically performed without user intervention.

7. An electronic apparatus comprising:
a communication interface comprising circuitry;
memory storing one or more instructions; and
processing circuitry,
wherein the one or more instructions, when executed by the processing circuitry individually or collectively, causes the electronic apparatus to:

in response to receiving a first authentication request from a display apparatus connected through a first communication protocol, control the communication interface to transmit, to the display apparatus, electronic apparatus identification information for identifying the electronic apparatus and unique identification information generated by the electronic apparatus, receive, from the display apparatus through the first communication protocol, a control signal indicating a success of a first authentication for the electronic apparatus performed by the display apparatus, in response to controlling the communication interface to transmit a second authentication request to the display apparatus connected through a second communication protocol different from the first communication protocol, receive, from the display apparatus, the unique identification information, which is generated by the electronic apparatus, transmitted to the display apparatus and stored in the display apparatus during the first authentication, perform a second authentication for the display apparatus determining that the unique identification information received from the display apparatus is identical to the unique identification information generated by and stored in the electronic apparatus and transmit, to the display apparatus through the second communication protocol, a control signal indicating a success of the second authentication, and according to a success of mutual authentication between the display apparatus and the electronic apparatus by the success of the first authentication and the success of the second authentication, control the communication interface to receive from the display apparatus, wireless communication connection information of the display apparatus which is used by the electronic apparatus for connecting to an access point.

8. The electronic apparatus of claim 7, wherein the one or more instructions, when executed by the processing circuitry individually or collectively, causes the electronic apparatus to:

in response to receiving a control signal indicating a success of the first authentication in response to the first authentication request, store the unique identification information, and in response to receiving a control signal indicating a failure of the first authentication in response to an input indicating that authentication of the electronic apparatus is not accepted for the first authentication request, discard the unique identification information.

9. The electronic apparatus of claim 7, wherein the one or more instructions, when executed by the processing circuitry individually or collectively, causes the electronic apparatus to control the communication interface to transmit a control signal indicating a failure of the second authentication to the display apparatus based on the unique identification information transmitted by the display apparatus not corresponding to the unique identification information stored in the electronic apparatus.

10. The electronic apparatus of claim 9, wherein the one or more instructions, when executed by the processing circuitry individually or collectively, causes the electronic apparatus to control the communication interface to transmit a control signal indicating a success of the second authentication of the display apparatus in response to receiving an input for operating a predetermined function of the electronic apparatus according to manual authentication performed on the display apparatus based on the control signal indicating the failure of the second authentication being transmitted.

11. The electronic apparatus of claim 7, wherein the one or more instructions, when executed by the processing circuitry individually or collectively causes the electronic apparatus to receive, from the display apparatus according to the success of the second authentication of the display apparatus, cloud access information used in accessing a cloud account of the display apparatus registered in a server computer.

12. The electronic apparatus of claim 7, wherein an authentication operation between the display apparatus and the electronic apparatus is performed based on the success of the first authentication and the success of the second authentication by a user input indicating acceptance of a user during the first authentication for authenticating the electronic apparatus by the display apparatus to cause the second authentication for authenticating the display apparatus by the electronic apparatus to be automatically performed without user intervention.

13. A method of operating a display apparatus, the method comprising:
in response to transmitting a first authentication request to an electronic apparatus connected through a first communication protocol, receiving, from the electronic apparatus, electronic apparatus identification information for identifying the electronic apparatus and unique identification information generated by the electronic apparatus,
in response to receiving a user input for accepting a first authentication in accordance with the electronic apparatus identification information, perform a first authentication for the electronic apparatus by storing the unique identification information received from the electronic apparatus and transmit, to the electronic apparatus through the first communication protocol, a control signal indicating a success of the first authentication,
in response to receiving a second authentication request from the electronic apparatus connected through a second communication protocol different from the first communication protocol, transmitting, to the electronic apparatus, the unique identification information which is stored in the display apparatus during the first authentication,
receiving, from the electronic apparatus, a control signal indicating a success of a second authentication which is performed by the electronic apparatus based on the unique identification information transmitted from the display apparatus being identical to the unique identification information generated by and stored in the electronic apparatus, and
according to a success of mutual authentication between the display apparatus and the electron apparatus by the success of the first authentication and the success of the second authentication, transmitting, to the electronic apparatus, wireless communication connection information of the display apparatus which is used by the electronic apparatus for connecting to an access point.

14. The method of claim 13, further comprising:
outputting a graphical user interface for inquiring about whether the electronic apparatus identification information is authenticated;
storing the unique identification information in response to an input for accepting authentication of the electronic apparatus; and
discarding the unique identification information in response to an input indicating that authentication of the electronic apparatus is not accepted.

15. The method of claim 13, further comprising:
receiving the control signal indicating a failure of the second authentication from the electronic apparatus based on the unique identification information transmitted by the display apparatus not corresponding to the unique identification information stored in the electronic apparatus; and
in response to receiving the control signal indicating the failure of the second authentication, outputting a graphical user interface for requesting manual authentication.

16. A method of operating an electronic apparatus, the method comprising:
in response to receiving a first authentication request from a display apparatus connected through a first communication protocol, transmitting, to the display apparatus, electronic apparatus identification information for identifying the electronic apparatus and unique identification information generated by the electronic apparatus,
receiving, from the display apparatus through the first communication protocol, a control signal indicating a success of a first authentication for the electronic apparatus performed by the display apparatus,
in response to transmitting a second authentication request to the display apparatus connected through a second communication protocol different from the first communication protocol, receiving from the display apparatus, the unique identification information, which is generated by the electron transmitted to the display apparatus and stored in the display apparatus during the first authentication,
performing a second authentication for the display apparatus by determining that the unique identification information received from the display apparatus is identical to the unique identification information generated by and stored in the electronic apparatus and transmit, to the display apparatus through the second communication protocol, a control signal indicating a success of the second authentication, and
according to a success of mutual authentication between the display apparatus and the electronic apparatus by the success of the first authentication and the success of the second authentication, receiving from the display apparatus, wireless communication connection information of the display apparatus which is used by the electronic apparatus for connecting to an access point.

17. A non-transitory computer-readable recording medium having recorded thereon one or more programs which, when executed by processing circuitry of a display apparatus, cause the display apparatus to perform operations comprising:
- in response to transmitting a first authentication request to an electronic apparatus connected through a first communication protocol, receiving, from the electronic apparatus, electronic apparatus identification information for identifying the electronic apparatus and unique identification information generated by the electronic apparatus,
- in response to receiving a user input for accepting a first authentication in accordance with the electronic apparatus identification information, perform a first authentication for the electronic apparatus by storing the unique identification information received from the electronic apparatus and transmit, to the electronic apparatus through the first communication protocol, a control signal indicating a success of the first authentication,
- in response to receiving a second authentication request from the electronic apparatus connected through a second communication protocol different from the first communication protocol, transmitting, to the electronic apparatus, the unique identification information which is stored in the display apparatus during the first authentication,
- receiving, from the electronic apparatus, a control signal indicating a success of a second authentication which is performed by the electronic apparatus based on the unique identification information transmitted from the display apparatus being identical to the unique identification information generated by and stored in electric apparatus, and
- according to a success of mutual authentication between the display apparatus and the electronic apparatus by the success of the first authentication and the success of the second authentication, transmitting, to the electronic apparatus, wireless communication connection information of the display apparatus which is used by the electronic apparatus for connecting to an access point.

* * * * *